(12) United States Patent  
Griffin et al.

(10) Patent No.: US 8,214,283 B2
(45) Date of Patent: Jul. 3, 2012

(54) COMPUTER IMPLEMENTED AND/OR ASSISTED METHODS AND SYSTEMS FOR PROVIDING RAPID EXECUTION OF, FOR EXAMPLE, LISTED OPTIONS CONTRACTS USING TOXICITY AND/OR PROFIT ANALYZERS

(75) Inventors: Kenneth C. Griffin, Chicago, IL (US); Matthew Andresen, Chicago, IL (US)

(73) Assignee: Citadel Investment Group, L.L.C., Chicago, IL (US)

( * ) Notice: Subject to any disclaimer, the term of this patent is extended or adjusted under 35 U.S.C. 154(b) by 0 days.

(21) Appl. No.: 13/154,675

(22) Filed: Jun. 7, 2011

(65) Prior Publication Data
US 2011/0238594 A1 Sep. 29, 2011

Related U.S. Application Data

(63) Continuation of application No. 10/993,273, filed on Nov. 19, 2004, now Pat. No. 7,958,039.

(60) Provisional application No. 60/617,300, filed on Oct. 8, 2004.

(51) Int. Cl.
*G06Q 40/00* (2006.01)

(52) U.S. Cl. .......................... 705/37; 37/36 R

(58) Field of Classification Search ............... 705/37, 705/36 R
See application file for complete search history.

(56) References Cited

U.S. PATENT DOCUMENTS

| | | | |
|---|---|---|---|
| 5,835,896 A | 11/1998 | Fisher et al. | |
| 5,873,071 A * | 2/1999 | Ferstenberg et al. | 705/36 R |
| 5,905,974 A | 5/1999 | Fraser et al. | |
| 5,940,809 A | 8/1999 | Musmanno et al. | |
| 6,016,483 A | 1/2000 | Rickard et al. | |
| 6,021,398 A | 2/2000 | Ausubel | |
| 6,112,189 A | 8/2000 | Rickard et al. | |
| 6,173,270 B1 | 1/2001 | Cristofich et al. | |
| 6,243,691 B1 | 6/2001 | Fisher et al. | |
| 6,377,940 B2 | 4/2002 | Tilfors et al. | |
| 6,618,707 B1 | 9/2003 | Gary | |
| 2001/0044767 A1 | 11/2001 | Madoff et al. | |
| 2002/0019795 A1 | 2/2002 | Madoff et al. | |
| 2002/0035534 A1 | 3/2002 | Buist et al. | |
| 2002/0055901 A1 * | 5/2002 | Gianakouros et al. | 705/37 |
| 2002/0087456 A1 | 7/2002 | Abeshouse et al. | |
| 2002/0091606 A1 | 7/2002 | Shapiro | |
| 2002/0095369 A1 | 7/2002 | Kaplan et al. | |
| 2002/0128958 A1 * | 9/2002 | Slone | 705/37 |
| 2002/0156716 A1 | 10/2002 | Adatia | |
| 2002/0161687 A1 | 10/2002 | Serkin et al. | |
| 2002/0194105 A1 | 12/2002 | Klein | |
| 2003/0004858 A1 | 1/2003 | Schmitz et al. | |
| 2003/0014354 A1 | 1/2003 | Madoff et al. | |
| 2003/0061148 A1 | 3/2003 | Alavian | |
| 2003/0088501 A1 | 5/2003 | Gilbert et al. | |
| 2003/0177082 A1 | 9/2003 | Buckwalter | |
| 2003/0177085 A1 | 9/2003 | Buckwalter et al. | |
| 2004/0002913 A1 | 1/2004 | Breen et al. | |
| 2004/0024689 A1 | 2/2004 | Zhou et al. | |
| 2004/0024691 A1 | 2/2004 | Satow et al. | |
| 2004/0030630 A1 | 2/2004 | Tilfors et al. | |
| 2005/0021445 A1 | 1/2005 | Caro | |
| 2005/0228741 A1 | 10/2005 | Leibowitz | |

FOREIGN PATENT DOCUMENTS

| | | |
|---|---|---|
| WO | WO-02/09008 A1 | 1/2002 |
| WO | WO-2004/042514 A2 | 5/2004 |

OTHER PUBLICATIONS

Battalio et al., "Toward a National Market System for U.S. Exchange-listed Equity Options" The Journal of Finance, vol. 59, No. 2, pp. 933-962 (2004).

(Continued)

*Primary Examiner* — Lindsay M. Maguire
(74) *Attorney, Agent, or Firm* — Wilmer Cutler Pickering Hale and Dorr LLP

(57) ABSTRACT

Methods and systems are provided which enable options broker-dealers to execute a listed options contract trade order while simultaneously eliminating (or at least reducing) exposure to the negative consequences associated with toxic (or likely toxic) trades in the options market. By using toxicity and/or profit analyzers, for example, to detect, track and respond to the level of toxic (or likely toxic) orders present in an option contract order flow, a broker dealer can reduce the level of risk inherent in serving as a counter-party in listed options transactions, and inherent in offering a rapid execution guarantee. Various alternative embodiments are also disclosed.

10 Claims, 29 Drawing Sheets

OTHER PUBLICATIONS

"Competitive Developments in the Options Market; Proposed Rule." Federal Register, vol. 69, No. 26. (Feb. 9, 2004).

Feb. 16, 2007. International Search Report and Written Opinion for PCT Application No. PCT/US2005/036608.

Forsyth "The Electronic Investor: What Need for Speed? As Online Brokers Tout Fast Executions, SEC Data Show Most Trades Take Only Two Seconds". Barrons(Jul. 5, 2004).

Glosten et al., "Bid, Ask and Transaction Prices in a Specialist Market with Heterogeneously Informed Traders" Journal of Financial Economics, vol. 14, pp. 71-100 (1985).

Nov. 13, 2006. International Search Report and Written Opinion for PCT Application No. PCT/US2005/034538.

Nov. 8, 2006. PCT International Search Report and Written Opinion for PCT Application No. PCT/US2005/035792.

"Payment for Order Flow and Internalization in the Options Market." SEC Special Study, Office of Compliance and Examination/Office of Economic Analysis. (Dec. 2000).

Simon, "Brokerags Battle for Active Traders—Fidelity, Schwab, Others Cut Commissions for Best Customers; The One-Second Execution" the Wall Street Jounal, (Jun. 22, 2004).

Tunick, "Playing the Wires: ATD's Trading Technology is Ahead of the Curve, But Can It reel in Retail Brokerages" Investment Dealers Digest, (Nov. 10, 2003).

* cited by examiner

300

| Contract Symbol | Broker-Dealer | Bid | Offer |
|---|---|---|---|
| XYZ | Exchange 1 | (40) | (41) |
| | Exchange 2 | 39 | 43 |
| | Exchange 3 | 38 | 42 |
| | Exchange 4 | 38 | 42 |
| PDQ | Exchange 1 | (17) | 20 |
| | Exchange 2 | 16 | (18) |
| | Exchange 3 | 16 | 19 |
| | Exchange 4 | 16 | 20 |

FIG. 3

COMPUTER IMPLEMENTED AND/OR ASSISTED METHODS AND SYSTEMS FOR PROVIDING RAPID EXECUTION OF, FOR EXAMPLE, LISTED OPTIONS CONTRACTS USING TOXICITY AND/OR PROFIT ANALYZERS

CROSS-REFERENCE TO RELATED APPLICATION

This application is a continuation of and claims priority under 35 USC §120 to U.S. patent application Ser. No. 10/993,273 titled "Computer Implemented And/Or Assisted Methods And Systems For Providing Rapid Execution Of, For Example, Listed Options Contracts Using Toxicity And/Or Profit Analyzers", filed Nov. 19, 2004, which claims priority under 35 USC §119(e) to U.S. Provisional Application No. 60/617,300, titled "Computer Implemented And/Or Assisted Methods And Systems For Providing Rapid Execution Of, For Example, Listed Options Contracts Using Toxicity And/Or Profit Analyzers," filed Oct. 8, 2004, which are hereby incorporated by reference herein in their entirety.

FIELD OF THE INVENTION

The present invention relates to computer implemented and/or assisted methods and systems for the trading of securities, such as listed options contracts. More particularly, this invention relates to computer implemented methods and systems that use toxicity and/or profit analyzers for detecting, tracking and/or responding to purchase and/or sell orders of a variety of securities, such as listed options contracts, that are likely to be, or are in fact, "toxic." In at least one embodiment, the invention relates to computer implemented methods and systems that provide guaranteed, specified and/or predetermined execution prices and/or guaranteed, specified and/or predetermined execution timeframes for these orders using toxicity and/or profit analyzers.

BACKGROUND OF THE INVENTION

There are several important players in the U.S. securities market, including investors, full-service broker-dealers, retail broker-dealers that do not execute their own orders but rather route their order flow to other broker-dealers for execution (also referred to herein as order flow providers, or OFPs), broker-dealers that consolidate order flow from multiple OFPs (also referred to herein as wholesalers, or consolidating broker-dealers), and market-makers. It will be understood that, as used herein, the term "broker-dealer" refers to any entity that, when acting as a broker, executes orders on behalf of his client, and that executes trades for his firm's own account when acting as a dealer.

Generally speaking, investors drive the market by entering orders to buy or sell one or more securities. An investor may be, for example, an individual or an institution, such as a mutual fund or a corporation. The OFPs in the market aggregate investor buy/sell orders, and deliver these orders to one or more consolidating broker-dealers (acting as wholesalers) or to market making firms.

In order to provide liquidity in the market, one or more dealers agree to maintain firm bid and ask prices in one or more specific securities. These dealers, which are commonly referred to as "market-makers," display bid and offer prices for these specific securities, and if these prices are met, will immediately buy for or sell from their own accounts. For example, almost every market (e.g., exchange, whether physical or virtual) where securities are traded has some form of market-maker that enters continuous two-sided quotations.

It is common for one or more market-makers on a given market to be provided significant responsibilities, including overseeing the opening, providing continuous quotations in all of their assigned securities, and handling customer orders that are not automatically executed in connection with that exchange. In the case of the U.S. equities and options exchanges, these market-makers, which are responsible for maintaining fair and orderly markets, are generally termed "specialists." Depending on the particular exchange, the "specialist" may be referred to as, for example, a designated primary market-maker (DPM), lead market-maker (LMM), or primary market-maker (PMM), etc. Other market-makers in the crowd on an exchange floor, if any, are referred to as "floor market-makers." For U.S. listed equities (e.g., stocks listed on the American Stock Exchange (AMEX) or the New York Stock Exchange (NYSE)), there are also firms that make markets off the exchange floor, and these firms are known as "over-the-counter" (OTC) market-makers or third market-makers.

Over the last half-century, the U.S. equities market has evolved into the widely accessible, efficient market we know today. This transformation has been driven, in part, by the demands of both retail and institutional investors for high quality and efficient trade execution.

Moreover, pricing efficiency in the U.S. equities market has benefited from various regulations that have been set forth by the Securities and Exchange Commission (SEC), the various securities exchanges, and the National Association of Securities Dealers (NASD), which is a self-regulatory organization (SRO) responsible for the operation and regulation of NASDAQ and over-the-counter markets. For example, a broker-dealer or market-maker must seek to obtain "best execution" (with order pricing being a significant factor) when handling a customer's equities order. In addition, there is a prohibition (subject to exceptions) in the listed equities markets against the practice of "trading-through," in which a customer's order for an exchange listed equity is executed at a price inferior to the best available bid or offer. This trade-through prohibition does not apply, however, to NASDAQ listed equities. Moreover, under the SEC's "firm quote" rule, which is also subject to exceptions, a broker-dealer or market-maker is required to execute any equities order presented to it to buy or sell a security at a price at least as favorable to the buyer or seller as its published bid or offer, up to its published quotation size. These and other requirements help to ensure a relatively transparent equities market.

Existing SEC rules require all equity market centers (e.g., exchanges and broker-dealers acting as market-makers) to report data regarding the execution quality (e.g., speed, effective spread, trade-throughs) of their trades. These rules allow investors and broker-dealers to identify and avoid those market centers with a record of poor execution quality, in favor of those with better execution quality histories. In some circumstances, the broker-dealer community as a whole may seek to reduce (or completely eliminate) its exposure to a particular exchange, trading system, or market-maker in response to consistent execution of low quality (e.g., slow or mis-priced) trades by that market center. In such cases, even at times when that market center has a quote representing the "national-best-bid-or-offer" (NBBO), the other broker-dealers in the community may choose to internalize their trades (see below), if possible, or to route their orders to another venue.

FIG. 1 is a simplified illustration of one example of an order flow in the U.S. equities market. In general, as shown, investor 110 submits an order to buy or sell an equity (or equities)

to OFP 120, which submits that order to wholesaler, or consolidating broker-dealer 130. In turn, consolidating broker-dealer 130 either internalizes the order (as explained below) or takes the order to an appropriate exchange of equities market 140 for execution. Equities market 140 shown in FIG. 1 may include, for example, the AMEX, the NYSE, NASDAQ (formerly referred to as the National Association of Securities Dealers Automated Quotation system), one or more electronic communications networks (ECNs), and one or more third market-makers. In equities market 140, publicly traded equities listed on one exchange can be traded, for example, on one or more regional stock exchanges (not shown), certain ECNs, and NASDAQ's SuperMontage system. It should also be noted that, with regard to NASDAQ (which is a competing dealer system and is currently not considered an "exchange"), consolidating broker-dealers can route orders in NASDAQ securities to NASDAQ's SuperMontage system, the NASD's Alternative Display Facility, ECNs, or specific NASDAQ market making firms.

In terms of fees associated with the order flow shown in FIG. 1, investor 110 pays OFP 120 a commission for executing his trade, while consolidating broker-dealer 130 pays OFP 120 for providing a given volume of order flow. The profit for consolidating broker-dealer 130, when internalizing the trade (as explained below), is made at the level of the trade execution, and is based on the spread between bid and offer prices for the equity (or equities) being bought or sold by investor 110. If consolidating broker-dealer 130 routes the order (e.g., to an exchange) for execution by another entity, however, consolidating broker-dealer 130 may receive some form of payment for the order flow (e.g., depending on the exchange that the order was routed to). When consolidating broker-dealer 130 is a full-service broker-dealer, for example, orders from investor 110 may be sent directly to consolidating broker-dealer 130 (which may then internalize the order or take the order to an appropriate exchange of equities market 140 for execution).

The concept of "trade execution quality" has emerged as a benchmark for investors to compare and contrast brokerage service providers along several dimensions, such as transaction costs, quote certainty, execution speed, price improvement, and market liquidity. In general, the growth of the investor community has placed continual pressure on service providers to improve execution quality along each of these dimensions.

The speed with which investor orders are filled in the U.S. equities market has benefited from the fact that broker-dealers who are OTC market-makers in listed equities and/or NASDAQ market-makers have the ability to "internalize" trades, in which they fill an order received from an OFP out of their own inventory in that equity. FIG. 2 is a simplified illustration of one example of an order flow in the U.S. equities market in which an order placed by investor 110 is internalized by consolidating broker-dealer 130. The ability of consolidating broker-dealer 130 to internalize a trade in the equities market affords it an opportunity to offer investors (such as investor 110) improved order execution speed. In addition, internalized orders have been known to receive some level of price improvement over the NBBO, with broker-dealers sometimes offering better fill prices to OFPs in exchange for a guaranteed level of trading volume.

Overall, the competitive landscape in the equities markets, along with the rapid expansion of internalization, have combined to provide investors with better execution quality along the price improvement and execution speed dimensions. For example, the equities market has progressed extremely rapidly over the last several years from ten-second trade execution guarantees to more recent guarantees of one-second executions, and at increasingly narrow bid/offer spreads.

As with equities, there is a very large market in the U.S. for the trading of options, which are financial instruments that are designed to provide the right, but not the obligation, to buy (for a call option) or sell (for a put option), for example, a specific amount of a given stock, commodity, currency, index, or debt, at a specified price (the strike price) during a specified period of time. Currently, listed options contracts can be traded on one or more of six national securities exchanges registered with the SEC. These exchanges are the AMEX, the Boston Options Exchange (BOX), the Chicago Board Options Exchange (CBOE), the International Securities Exchange (ISE), which is now the largest market for the trading of equity options, the Pacific Exchange (PCX), and the Philadelphia Stock Exchange (PHLX). The first four of these exchanges to come into existence, the AMEX, the CBOE, the PCX, and the PHLX, have traditionally used physical trading floors on which specialists and/or floor market-makers provide liquidity in assigned options classes, subject to certain affirmative and negative obligations. The ISE and the BOX, on the other hand, are both fully electronic options exchanges that began operating in the past few years largely following a demand for increased automation.

The U.S. options market also operates under SEC and exchange regulations regarding best execution and firm quotes, and is subject to rules designed to prevent trade-throughs (which generally includes filling an order at a price inferior to the NBBO). In order to determine the NBBO for an option contract, which may be trading on more than one exchange, it is necessary to gather information from potentially multiple exchanges. This is accomplished in the following manner. The Option Price Reporting Authority ("OPRA") transmits quotations and trade reports from the options market to vendors for dissemination to the public. OPRA streams an NBBO data feed for the options market by aggregating the highest priced bid and lowest priced offer quoted at the time on all of the registered options exchanges. If two exchanges are quoting at the same price which would set the NBBO, the exchange quoting the larger number of contracts will be designated the NBBO. If the quotes have the same number of contracts as well, the first exchange to post the quote will be designated the NBBO.

FIG. 3 is a table 300 showing illustrative bids and offers received from various exchanges in connection with options contracts "XYZ" and "PDQ," which are to be gathered and disseminated through OPRA. It will be understood that, when there is intra-exchange competition, each exchange will generally collect the individual quotes by its specialists and market-makers and send its best-bid-or-offer (BBO) to OPRA. OPRA then uses the various exchange BBOs to calculate the NBBO. With regard to options contract "XYZ," it can be seen from table 300 that Exchange 1 provides the best (i.e., highest) bid of "40," and also provides the best (i.e., lowest) offer of "41." Accordingly, the best bid for "XYZ" is 40, and the best offer for "XYZ" is "41". For options contract "PDQ," meanwhile, it can be seen from table 300 that the best bid for "PDQ" is "17," and the best offer for "PDQ" is "18." To facilitate the reading of table 300, the best bids and offers (NBBO) for both "XYZ" and "PDQ" have been circled. It will be understood that the bids and offers provided in table 300, as well as the number of exchanges shown for each type of contract, are for illustrative purposes only.

The options intermarket "linkage" system provides specialists and floor market-makers with the ability to reach superior prices in other exchanges, and is designed to encourage efficient pricing and best execution for customer orders.

FIG. 4 is a simplified illustration of the linkage system used to connect various exchanges in the U.S. options market. As shown in FIG. 4 (and mentioned above), the U.S. options market 440 includes the following exchanges: AMEX 442, BOX 443, CBOE 444, ISE 445, PCX 446, and PHLX 447. The NBBO is determined with regards to these options exchanges 442-447 as described above. The linkage system 450 provides certain participants in one market (exchange) with an automated means of obtaining access to better prices displayed in another market (exchange). When an order is routed to an exchange that is not displaying the NBBO, as explained in greater detail below, that exchange generally must either match the NBBO or transmit the order to the market that is quoting the superior price. An exchange that receives an incoming linkage order that represents an underlying customer order generally has fifteen seconds to either execute the order in whole or execute the order in part (e.g., when the incoming linkage order is larger than the "Firm Customer Quote Size"), cancel the rest, and move its displayed quotation to an inferior price. As also shown in FIG. 4, linkage system 450 uses telecommunication links 461-466. It will be understood that these links may operate using any of a number of known electronic data exchange mechanisms, including local and wide area networks, optical cable connections, dial-up telephone connections, the Internet, etc., and may be wire or wireless based.

The linkage system requires exchanges to avoid executing trades at prices inferior to the best available prices (e.g., "trade-throughs"), as represented by the NBBO disseminated by OPRA. For example, if an exchange that receives an investor's order through an automatic execution system, or electronic order routing system, is at the NBBO, the order will generally be automatically executed at the NBBO (assuming the order is for a number of contracts less than a threshold quantity), with the specialist receiving a certain share of the order based on the exchange rules. However, if the investor's order is routed to an exchange that is not at the NBBO (e.g., because the exchange receiving the order is faster or offers greater certainty of execution than other markets), generally speaking, that exchange must either "step up" and at least match the NBBO or route the order away to another exchange that is displaying the NBBO. Assuming the order is not routed away, it is possible for the specialist (or other type of market-maker, if the exchange permits) to "step up" and fill up to 100% of the order at the NBBO.

It should be noted, however, that the linkage system does not prohibit trade-throughs in all cases, but requires that market participants avoid initiating trade-throughs unless one of a list of SEC-approved exceptions applies (e.g., in the case of "fast" or otherwise unusually volatile market conditions). In fact, the wide-spread invocation of such exceptions to the firm quote and trade-through rules has created a difficult environment for market participants seeking to provide better execution quality for customers.

FIG. 5 is a simplified illustration of one example of an order flow in the options market. As shown, investor 510 submits an order to buy or sell one or more options contracts to OFP 520, which submits that order to a wholesaler, or consolidating broker-dealer 530. In turn, consolidating broker-dealer 530 checks the NBBO (which is determined, for example, as described above), as well as the exchange(s) on which the order may potentially be executed. Based on its duty to seek to obtain best execution for investor 510, broker-dealer 530 takes the order to an appropriate exchange of options market 540 (which includes, for example, the exchanges associated with options market 440 shown in FIG. 4 and described above) for execution. If the order is routed to a floor-based exchange, and, for example, is not eligible for automatic execution or is represented by a floor broker, it will generally be exposed to a physical auction on the exchange floor. In this case, the order will finally be filled by the specialist and floor market-makers based upon exchange-specific priority rules. However, this process may take, for example, between ten to fifteen seconds, and even up to several minutes, to complete. Alternatively, if the order is routed to a purely electronic exchange, a more rapid electronic auction and filling process occurs. However, the requirements of linkage can introduce delay into this process as well, as some orders may be required to be routed to floor-based exchanges in order to avoid a trade-through (execution at a price inferior to the NBBO).

In terms of fees associated with the order flow shown in FIG. 5, investor 510 pays OFP 520 a commission for executing his trade, while consolidating broker-dealer 530 pays OFP 520 for providing a given volume of order flow. When consolidating broker-dealer 530 simply takes the order from OFP 520 and routes it to an exchange, it generally receives some form of payment from the exchange. If a market-maker (e.g., specialist) that is associated with consolidating broker-dealer 530 handles the order on the exchange, however, the profit for consolidating broker-dealer 530 may be at least partially based on the spread between bid and offer prices for the option contract. It is possible for OFP 520 to be bypassed by investor 510, and, for example, for the order to be provided directly to a full-service broker-dealer for execution.

There are important differences between the U.S. options and equities markets which have the potential to reduce the execution quality available to investors in listed options contracts. For example, U.S. options broker-dealers cannot internalize trades (fill orders received from their own inventory of options contracts) in the same way that equity broker-dealers can. In particular, the rules of the Options Clearing Corporation (which is the issuer of all listed options contracts in the U.S. options market) require that all transactions in listed options take place through the facilities of an exchange. Accordingly, it is not possible for an options broker-dealer to perform, for example, an "upstairs" or "over-the-counter" transaction in a listed options contract. Rather, options broker-dealers can internalize a trade only after certain conditions have been met. For example, in the case of a "facilitation cross," a broker-dealer may execute a customer order as principal only after the order has been exposed to the market via an auction process. This auction allows members of the crowd on that exchange to participate in the trade at the proposed or an improved price. The broker-dealer is only entitled to trade with the customer (by crossing the customer's order and the order for the firm's own account) after other better-priced quotes and public orders have been filled. In the equity markets, no such market exposure need take place, where "upstairs" block trading by a broker-dealer, for example, is permissible.

As explained above, SEC rules require equity market centers (e.g., exchanges and broker-dealers acting as market-makers) to report data regarding the execution quality of their trades. However, in the options markets, there are no universally accepted metrics for reporting execution quality, and as a result, there are no regulations requiring that such data be reported. This makes it very difficult for investors or broker-dealers to discourage certain behaviors of, for example, an offending specialist on an exchange (e.g., by taking their business to an exchange that has a record of better execution quality).

Several innovations have been introduced in the past by options market participants to try to improve execution quality. One such development, intended to improve execution speed, has been the expansion of automated trading systems onto the original floor-based exchanges. A specific example of this is the growing prevalence of automatic execution ("auto-ex") systems for executing relatively small orders quickly and efficiently. Under such systems, orders routed to an exchange involving fewer than a threshold number of contracts may be tagged as "auto-ex" eligible, and will be executed at the prevailing bid/offer (the exchange's disseminated price) without exposure to auction on the exchange floor. The disseminated price on most floor-based exchanges is typically a specialist's "auto-quote," which is updated based on characteristics of the option (e.g., volatility, interest rate, dividend).

Other efforts have been made to improve option order execution quality along the speed dimension, such as the development of "pseudo-internalization" methods, as described in commonly owned U.S. Provisional Patent Application No. 60/613,793, titled "Computer Implemented and/or Assisted Methods and Systems For Providing Guaranteed, Specified and/or Predetermined Execution Prices in a Guaranteed, Specified, and/or Predetermined Timeframe on the Purchase or Sale of, For Example, Listed Options" and filed on Sep. 27, 2004, which is hereby incorporated by reference herein in its entirety. As described in greater detail below, the concept of pseudo-internalization involves the use of, for example, a group of affiliated market-makers that together are able to provide options orders with a guaranteed order execution price and/or a guaranteed order execution time-frame.

On another front, floor-based exchanges are also developing hybrid electronic trading systems to improve execution quality along the pricing dimension by encouraging quote competition. This is an effort to move closer to the electronic exchange model, in which multiple parties (e.g., specialists and market-makers) compete to set an exchange's BBO level. For example, the CBOE Hybrid Trading Platform, which was introduced in 2003, allows specialists (referred to on that exchange as DPMs) and market-makers to electronically submit quotes for certain (but not all) designated option classes. These quotes, taken together with electronically submitted floor broker bids submitted on behalf of customers, are aggregated to determine the CBOE's BBO. This provides a similar competitive quotation result to the all-electronic ISE. The PCX Hybrid Trading Platform, also introduced in 2003, is very similar.

On the electronic exchange front, there have also been efforts to improve execution quality along the pricing dimension. The Boston Options Exchange (BOX) has implemented an electronic trading mechanism referred to as the Price Improvement Period (PIP) which is described in WO/2004/042514 to Peterffy, published May 21, 2004, and is hereby incorporated by reference herein in its entirety. Moreover, the ISE recently proposed to implement an electronic trading mechanism referred to as the Price Improvement Mechanism (PIM). A description of the ISE's proposed PIM is available at http://www.sec.gov/rules/sro/ise/34-49323.pdf, which is also incorporated herein by reference in its entirety.

Additional efforts to improve the trading of options and other securities are also described in the following published U.S. patent applications, which are hereby incorporated by reference herein in their entirety: U.S. patent application Ser. No. 09/841,388 to Adatia (Publication No. US 2002/0156716), published Oct. 24, 2002; U.S. patent application Ser. No. 09/896,061 to Schmitz et al. (Publication No. US 2003/0004858), published Jan. 2, 2003; U.S. patent application Ser. No. 10/246,562 to Muckwalter et al. (Publication No. US 2003/0177085), published Sep. 18, 2002; and U.S. patent application Ser. No. 10/623,434 to Zhou et al. (Publication No. US 2004/0024689), published Feb. 5, 2004.

With the improvements in execution quality offered by consolidating broker-dealers in the options market, however, has come increased risk to those same broker-dealers of exploitation by professional traders. These professional traders often possess (and seek to profit from) knowledge not available to the general investing public about the true underlying value of an options contract, as well as where the price of the options contract will (or is likely to) move in the near future. This is in contrast to standard traders, who are more likely to trade based on pure speculation, publicly available information, and/or liquidity or hedging needs, for example, and are thus less likely to have the information necessary to capitalize on "toxic" orders (which generally refers to orders that, if accepted by a consolidating broker-dealer, would result in no profit, reduced profit and/or a loss to the broker-dealer and/or an affiliate of the broker-dealer). Stated another way, an order for an options contract is said to be toxic from the standpoint of a consolidating broker-dealer when it is asked to supply market liquidity (i.e., to buy or sell) in situations where it makes no profit, reduced profit and/or indeed takes a loss on the trade.

An example of the potential ramifications of trading on a toxic order is now provided. Referring again to FIG. 5, assume that consolidating broker-dealer 530 is associated with a specialist in XYZ options contracts on the ISE (in this case, the specialist is referred to as a PMM). Moreover, assume that the bid price on XYZ call options is falling rapidly in real time due to recently released news about the company, and that the NBBO bid of "40" for XYZ (as shown in table 300 of FIG. 3) is actually a stale bid displayed by one of the manual options exchanges (with the theoretical fair value of the option having dropped to "38"). This stale bid situation may arise, for example, when an exchange specialist claims exceptions from the specialist's firm quote obligations (in order to delay trade execution until conditions are more favorable or to not fill the order at all), and the exchange is slow to update its quotes to reflect market developments. If the PMM associated with consolidating broker-dealer 530 is bound by a rapid execution guarantee and has agreed to always "step up" to the NBBO, a professional trader would see this quote-value discrepancy and be able to exploit the rapid execution guarantee by forcing the PMM affiliated with consolidating broker-dealer 530 to buy at "40" (to match the NBBO) even though the PMM was bidding at a lower price and, in fact, thinks the contract is only worth "38." The trader is thus able to earn a potentially sizable profit, while consolidating broker-dealer 530 and/or its associated PMM is forced to absorb the loss due to the toxic order.

Moreover, consolidating broker-dealer 530 and/or an associated market-maker (e.g., specialist) may be forced to absorb a loss on a toxic order even when a rapid execution guarantee is not being provided. For example, consider a situation where a professional trader has knowledge (e.g., insider information) suggesting that the theoretical fair value (e.g., the value to which the price is likely to move in the near future) of an XYZ options contract is lower than the current NBBO price. In this case, the professional trader will be more likely than a standard trader to sell at the NBBO price (which would likely result in a toxic order and a loss for consolidating broker-dealer 530), and will also be more likely than a standard trader to refuse to buy at the NBBO price (which would likely result in a profit for consolidating broker-dealer 530).

As a consolidating broker-dealer, whether or not it is offering a rapid execution guarantee, is generally more likely to receive toxic orders from professional traders than from standard traders, the broker-dealer will generally be able to earn higher profits (or at worst break-even) over time by trading with standard traders. In light of this, a consolidating broker-dealer (particularly one offering an execution-speed guarantee) would be willing to pay for the privilege of trading with standard traders, if it were feasible to identify them. It would therefore be desirable to provide a system and method which would allow a market participant to detect and track the level of orders in a given option contract order flow that are likely to be, or in fact are, "toxic" versus the orders that are likely to be, or in fact are, "non-toxic." Moreover, an ideal system would allow the market participant to respond to the nature of that order flow by, for example, rewarding a trading party (e.g., an OFP or an investor) for providing a less "toxic" option contract order flow.

SUMMARY OF THE INVENTION

Computer-implemented and/or assisted methods and systems are provided that use toxicity and/or profit analyzers for detecting, tracking and/or responding to purchase and/or sell orders of a variety of securities, such as listed options contracts, that are likely to be, or are in fact, "toxic," and optionally providing guaranteed, specified and/or predetermined execution prices and/or guaranteed, specified and/or predetermined execution timeframes for these orders. By providing means, devices and/or processes to detect, track and respond to the level of toxic (or likely toxic) orders present in an option contract order flow using, for example, in at least one embodiment of the invention, order toxicity characteristics and/or profit analyzers, these methods and systems allow for better execution quality for investors, while eliminating (or at least reducing) the level of broker-dealer risk inherent in serving as a counter-party in listed options transactions, and inherent in offering a rapid execution guarantee.

In one embodiment of the invention, a method of executing an order for a listed options contract comprises the sequential, sequence independent and/or non-sequential steps of receiving the order by a broker-dealer including order characteristics, determining at least one toxicity quotient responsive to the order characteristics, and analyzing the order to determine eligibility for execution using the at least one toxicity quotient. If it is determined that the order is eligible for execution, the method includes sending the order by the broker-dealer to an options exchange for execution responsive to the eligibility for execution as determined by the analyzing the order using the at least one toxicity quotient.

In another embodiment of the invention, a method of executing an order for a listed options contract comprises the sequential, sequence independent and/or non-sequential steps of receiving the order by a broker-dealer, sending the order by the broker-dealer to an options exchange for execution, and monitoring the outcome of the trade when the order is sent to the options exchange for execution. If it is determined that the completed trade is toxic, the method implements a corrective action based at least in part on the step of monitoring the outcome of the trade.

A method of executing an order for a listed options contract comprises the sequential, sequence independent and/or non-sequential steps of receiving the order for a listed options contract by a broker-dealer, and determining conformance of the order for a listed options contract with a rule-set. The rule-set is based at least in part on the measuring of at least one of order, market condition, and execution parameters of at least one order to be executed and correlating the measured parameters with the outcome of the trade. If it is determined that the order for a listed options contract conforms with the rule-set, the method sends the order for a listed options contract by the broker-dealer to an options exchange for execution.

In alternative embodiments, the invention includes a computer system and/or tangible medium for implementing the method.

In alternative embodiments, the method measures at least one of order, market condition, and execution parameters of at least one order to be executed, and correlating the measured parameters with the outcome of trade to determine the at least one toxicity quotient.

In alternative embodiments, the method reviews one or more parameters of the order relating to at least one of size of the order, frequency of order submission, identity of the option, market source of national-best-bid-or-offer (NBBO), order size relative to NBBO size, liquidity of the option contract in the market, liquidity of the underlying equity, current NBBO bid-offer spread, and option class of the order.

In alternative embodiments, the method determines at least one toxicity quotient responsive to the order characteristics and generating the at least one toxicity quotient by the broker-dealer.

In alternative embodiments, the method receives the at least one toxicity quotient by the broker-dealer.

In alternative embodiments, the method either rejects the order or executes a modified version of the order based on execution eligibility.

In alternative embodiments, the method uses a modified version of the order that comprises at least one of a modified order size and a modified option identity.

In alternative embodiments, the toxicity is modified following its generation. In alternative embodiments, the method receives the order from an order flow provider, and sends the order from the order flow provider to the broker-dealer.

In alternative embodiments, the method sends a toxicity report to the order flow provider based at least in part on the execution eligibility determination. In alternative embodiments, the method places the order by an investor.

In alternative embodiments, the method places the order by an order flow provider. In alternative embodiments, the method monitors the outcome of the trade when the order is sent to the exchange for execution.

In alternative embodiments, the method logs the bid/offer spread at the time the order is filled.

In alternative embodiments, the method implements corrective action based at least in part on the step of monitoring the outcome of the trade.

In alternative embodiments, the method takes corrective action comprises modifying payment for the order received by the broker-dealer.

In alternative embodiments, the method takes corrective action and modifies payment for future order flow received by the broker-dealer.

In alternative embodiments, the method takes corrective action and increases the fee for the investor that placed the order received by the broker-dealer.

In alternative embodiments, the method takes corrective action and increases the fee for future orders submitted by the investor that placed the order received by the broker-dealer.

In alternative embodiments, the method determines conformance of the order responsive to a rule-set providing at least one rule used to implement the order execution.

In alternative embodiments, the method forms a rapid execution consortium (REC) that comprises a plurality of options market-makers, wherein the members of the REC collectively have step-up capability for a substantial portion of all listed options classes.

In alternative embodiments, the members of the REC collectively have step-up capability for at least one of 30%, 50% and 75% of all listed options classes. In alternative embodiments, the broker-dealer is part of the REC. In alternative embodiments, at least one of the plurality of market-makers is an affiliate of the broker-dealer. In alternative embodiments, the REC further comprises one or more additional broker-dealers.

In alternative embodiments, the market-makers each operate on the same options exchange. In alternative embodiments, the method analyzes the order to determine its eligibility for execution in accordance with a rapid execution guarantee. In alternative embodiments, the method provides a rapid execution guarantee in connection with the order based at least in part on the step of analyzing the order to determine its eligibility for execution in accordance with a rapid execution guarantee.

In alternative embodiments, the rapid execution guarantee comprises at least one of a guaranteed, specified and predetermined execution price and/or at least one of a guaranteed, specified and predetermined timeframe. In alternative embodiments, the method provides a rapid execution guarantee that provides a guarantee to execute the order at least one of a guaranteed, specified and predetermined execution price and/or within at least one of a guaranteed, specified and predetermined timeframe.

In alternative embodiments, the method processes the order by a routing system to determine which of a plurality of market-makers has step-up capability for the listed options contract on at least one options exchange. In alternative embodiments, the method sends the order to an options exchange for execution based at least in part on the presence of a market-maker with step-up capability for the listed options contract on the exchange. In alternative embodiments, the step-up capability of the market-maker present on the options exchange executes the order when the order is not automatically executed by an automatic execution system of the options exchange.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which:

FIG. 3 is a table showing illustrative bids and offers received from various market-makers in connection with two separate options contracts;

DETAILED DESCRIPTION OF THE INVENTION

The following description includes many specific details. The inclusion of such details is for the purpose of illustration only and should not be understood to limit the invention. Moreover, certain features, which are well known in the art, are not described in detail in order to avoid complication of the subject matter of the present invention. In addition, it will be understood that features in one embodiment may be combined with features in other embodiments of the invention.

Computer implemented and/or assisted methods and systems are described for the detection, tracking and response to orders in an option contract order flow that are likely to be, or are in fact, "toxic" using, for example, toxicity and/or profit analyzers. It will be understood that, as used herein, the phrase "rapid execution guaranty" or "rapid order execution guarantee" in the context of orders for listed options contracts refers to the execution of listed options contracts at guaranteed, specified and/or predetermined execution prices within a guaranteed, specified and/or predetermined timeframe. In at least one embodiment of the invention, order toxicity characteristics and/or profit analyzers are used to quantify and/or mitigate the risk inherent in serving as a counter-party in listed options transactions. According to various other embodiments, order toxicity characteristics and/or profit analyzers are used to quantify and/or mitigate the risk inherent in the provision of rapid execution guarantees in connection with, for example, listed options contracts. Therefore, as will be clear from the description provided below, the principles of the present invention are applicable both in cases where a rapid execution guarantee is not being provided, as well as where a rapid execution guarantee is potentially being provided.

Figure 1:
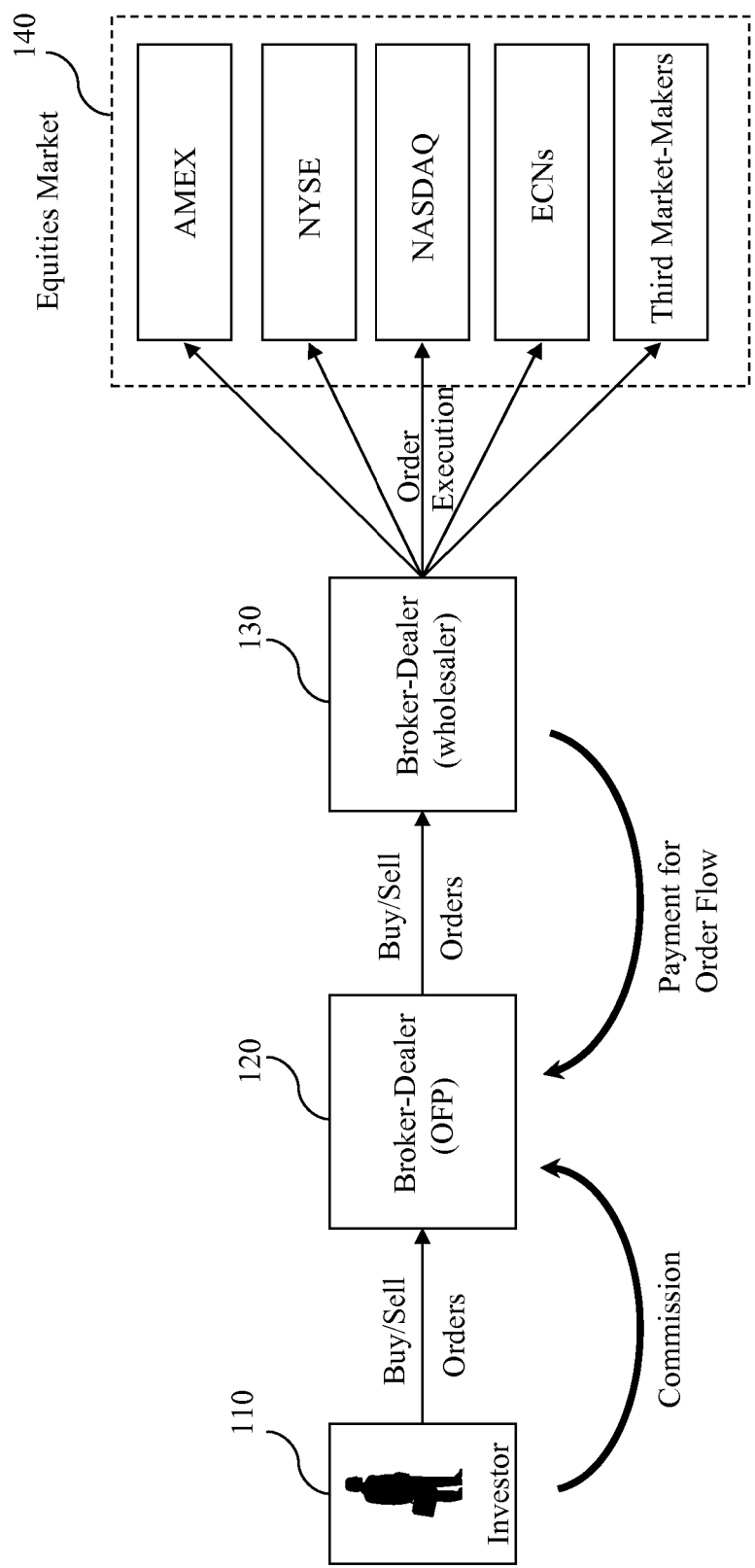
FIG. 1 is a simplified illustration of one example of an order flow in the U.S. equities market.
Figure 2:
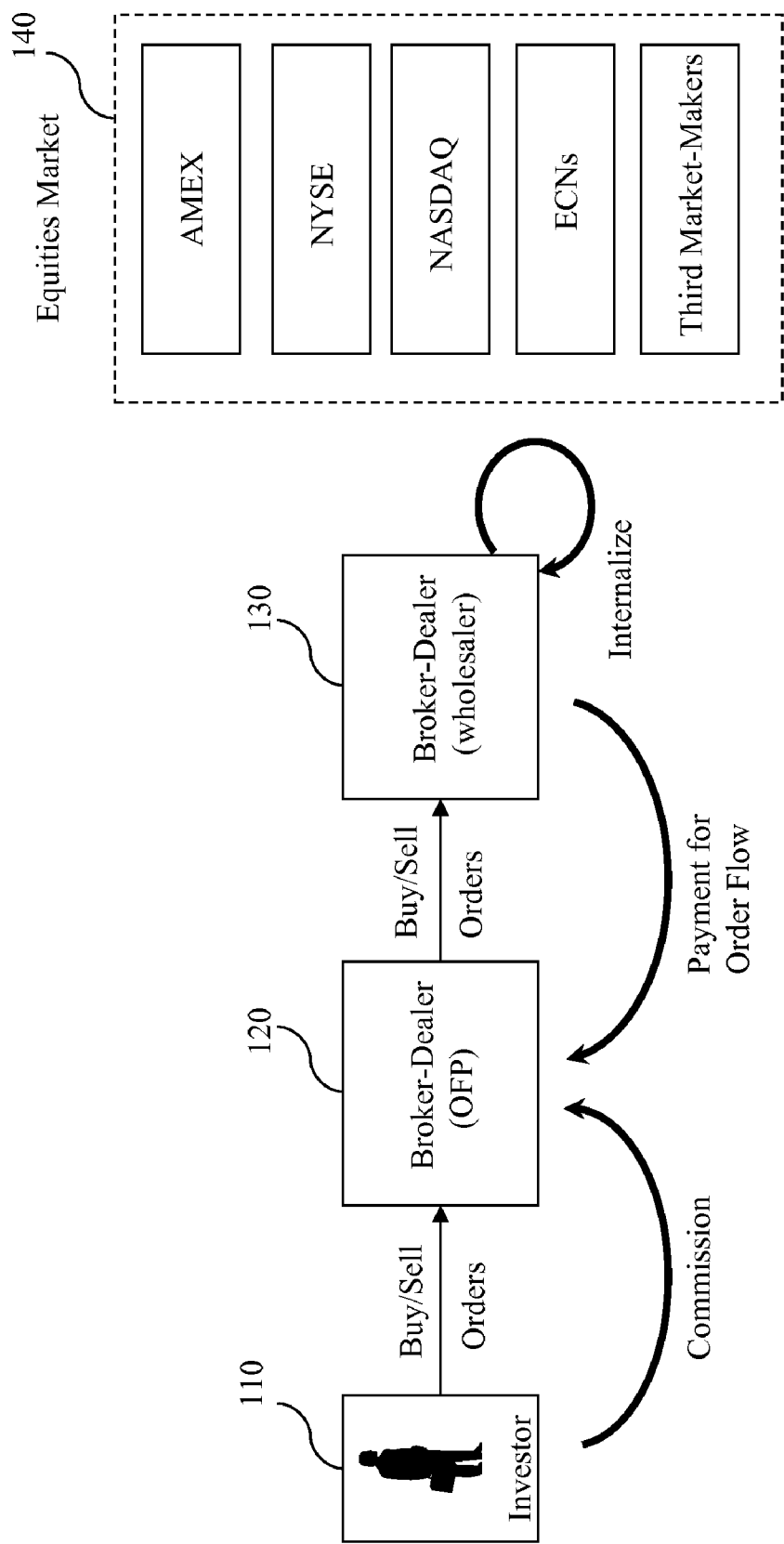
FIG. 2 is a simplified illustration of another example of an order flow in the U.S. equities market, in which an order placed by an investor is internalized by a broker-dealer.
Figure 4:
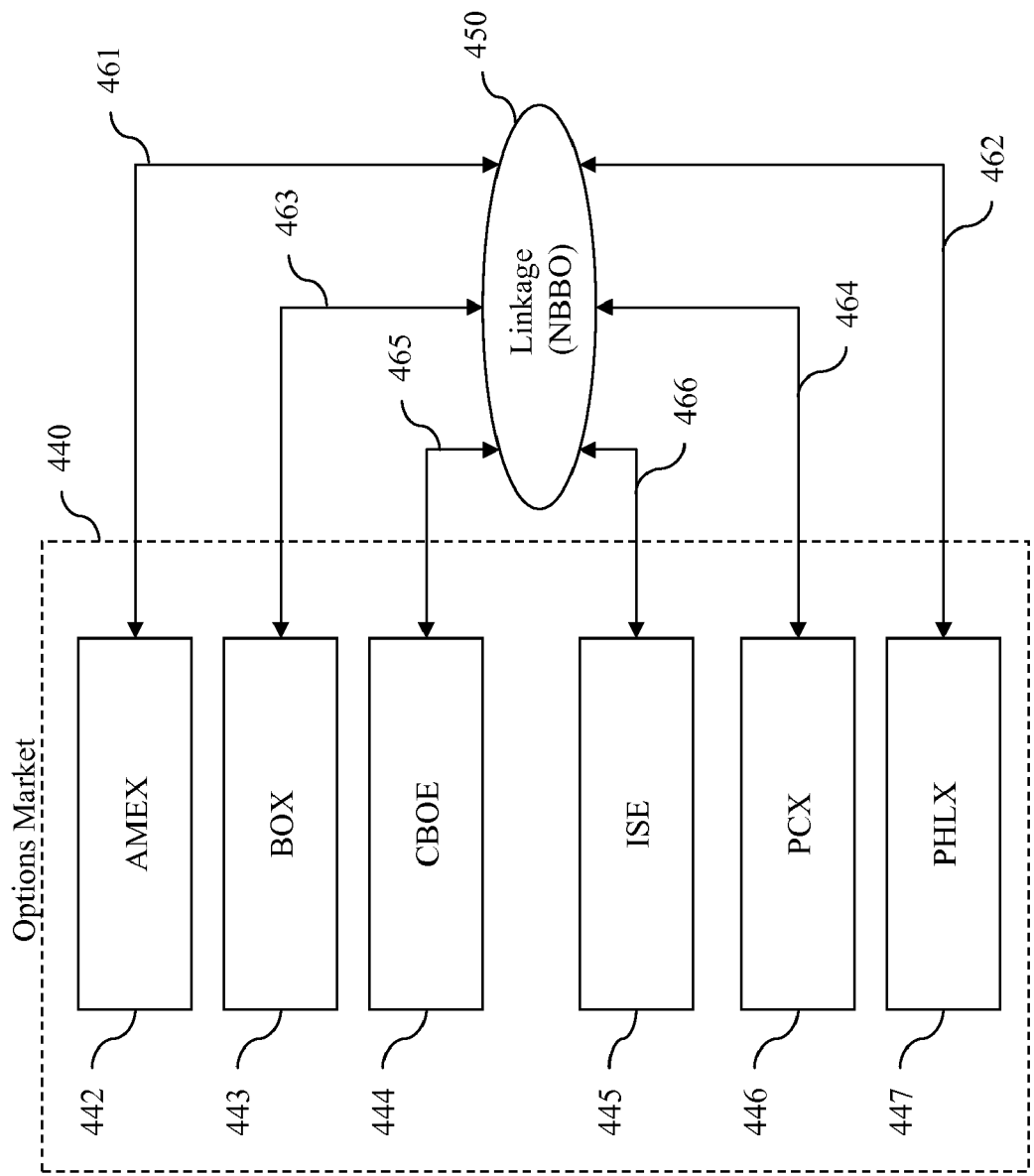
FIG. 4 is a simplified illustration of the linkage system used to connect various exchanges in the U.S. options market.
Figure 5:
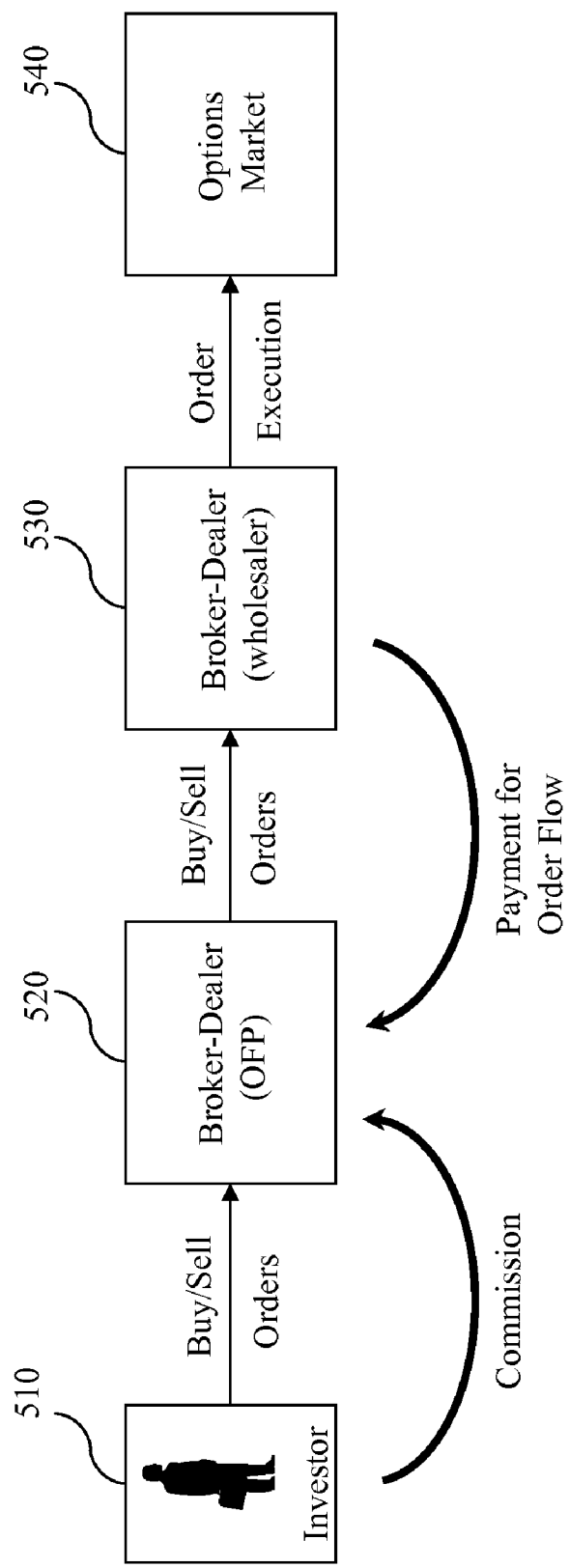
FIG. 5 is a simplified illustration of one example of an order flow in the options market.

As mentioned above, options broker-dealers (such as consolidating broker-dealer 530 of FIG. 5) cannot internalize trades for listed options in the same way that equity broker-dealers can for listed stocks. However, consolidating broker-dealers (such as consolidating broker-dealer 530) may nonetheless be able to successfully offer option trade execution speed guarantees using, for example, the concept of "pseudo-internalization" as explained in U.S. Provisional Patent Application No. 60/613,793 (hereinafter, "the Application"). As explained in the Application, in instances where consolidating options broker-dealer 530 is affiliated with an options market-making firm having at least one market-maker (e.g., a PMM on the ISE) with step-up capability for a listed options contract, it can "pseudo-internalize" an order for the listed options contract. That is, as long as the market-maker (which may be a specialist) is able and willing to match the NBBO corresponding to the requested trade, investor 510 can be assured of an execution at the NBBO (either via automatic execution or a step up of, for example, the PMM) within the predetermined time frame. Thus, for listed options classes in which a given broker-dealer is affiliated with such an options market-making firm having at least one market-maker with step-up capability, the broker-dealer may extend a guarantee of rapid execution, thereby eliminating the risk of delaying the trade when the NBBO is displayed by another exchange that is slow or offers less certainty of execution. As a given options market-making firm generally has one or more specialists and/or other market-makers for only some (e.g., up to 60%) of all available options classes, however, it may be desirable to implement full or at least substantial coverage of all option classes by assembling a "Rapid Execution Consortium" (REC) as described in the Application. For example, this REC may include a network of options market-making firms (each of which includes one or more specialists or other market-makers on at least one options exchange) representing up to 100% coverage of the full options market, where these firms and/or their specialists or other market-makers are, for example, contractually bound to immediately execute all orders routed to the relevant exchange or exchanges (both at the NBBO and within the guaranteed time window) when the orders are not automatically executed by the exchange system(s). As explained in greater detail below, these options market-making firms may or may not be a part of the same legal entity as the broker-dealer(s) that rely on their obligation (or willingness) to step-up and fill certain orders.

Figure 6:
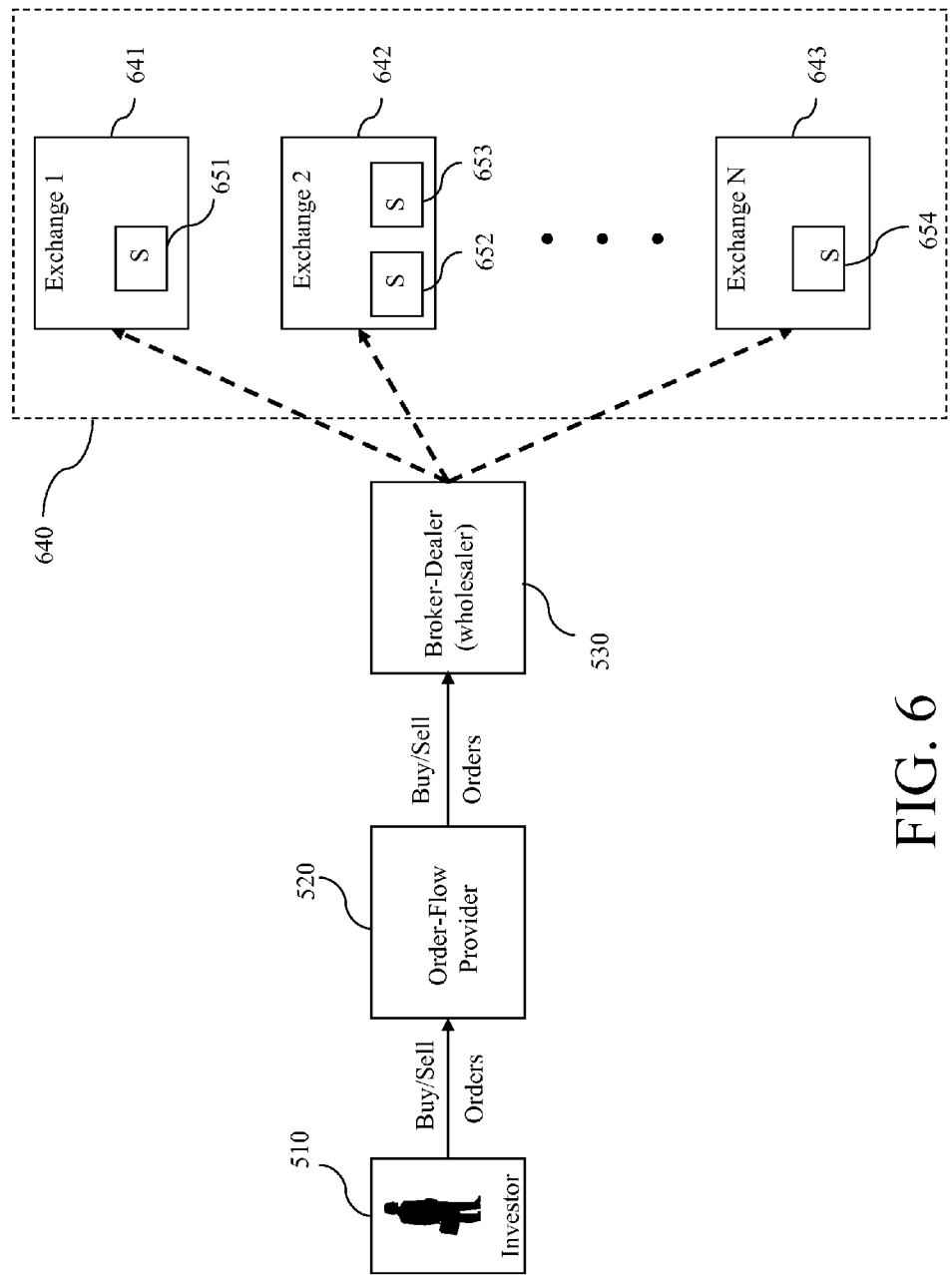
FIG. 6 is a simplified illustration of one example of a pseudo-internalization order flow in the options market.

FIG. 6 is an illustration of one embodiment of a pseudo-internalization order flow according to the principles described in the Application. As shown, options market 640 shown in FIG. 6 includes exchanges 641-643. Moreover, for the order flow shown in FIG. 6, the REC includes consolidating broker-dealer 530, and options specialists 651-654 which are associated with the various exchanges in options market 640. It will be understood that, although specialists are shown and described herein with respect to FIGS. 6-8, market-makers that have step-up capability but are not considered specialists may also used in the REC. As shown, specialist 651 is associated with exchange 641, specialists 652-653 are associated with exchange 642, and specialist 654 is associated with exchange 643. Specialists 651-654 serve as specialists (on at least one exchange) for a large percentage of the available options, and preferably 100% of the available options. In the latter case, regardless of the type of option contract requested by investor 510, consolidating broker-dealer 530 will be able to send the order to an exchange (e.g., exchange 641, 642, or 643) for rapid execution, given that the exchange will either automatically execute the order, or the appropriate specialist of specialists 651-654 will fill the order within a guaranteed period of time.

Figure 7:
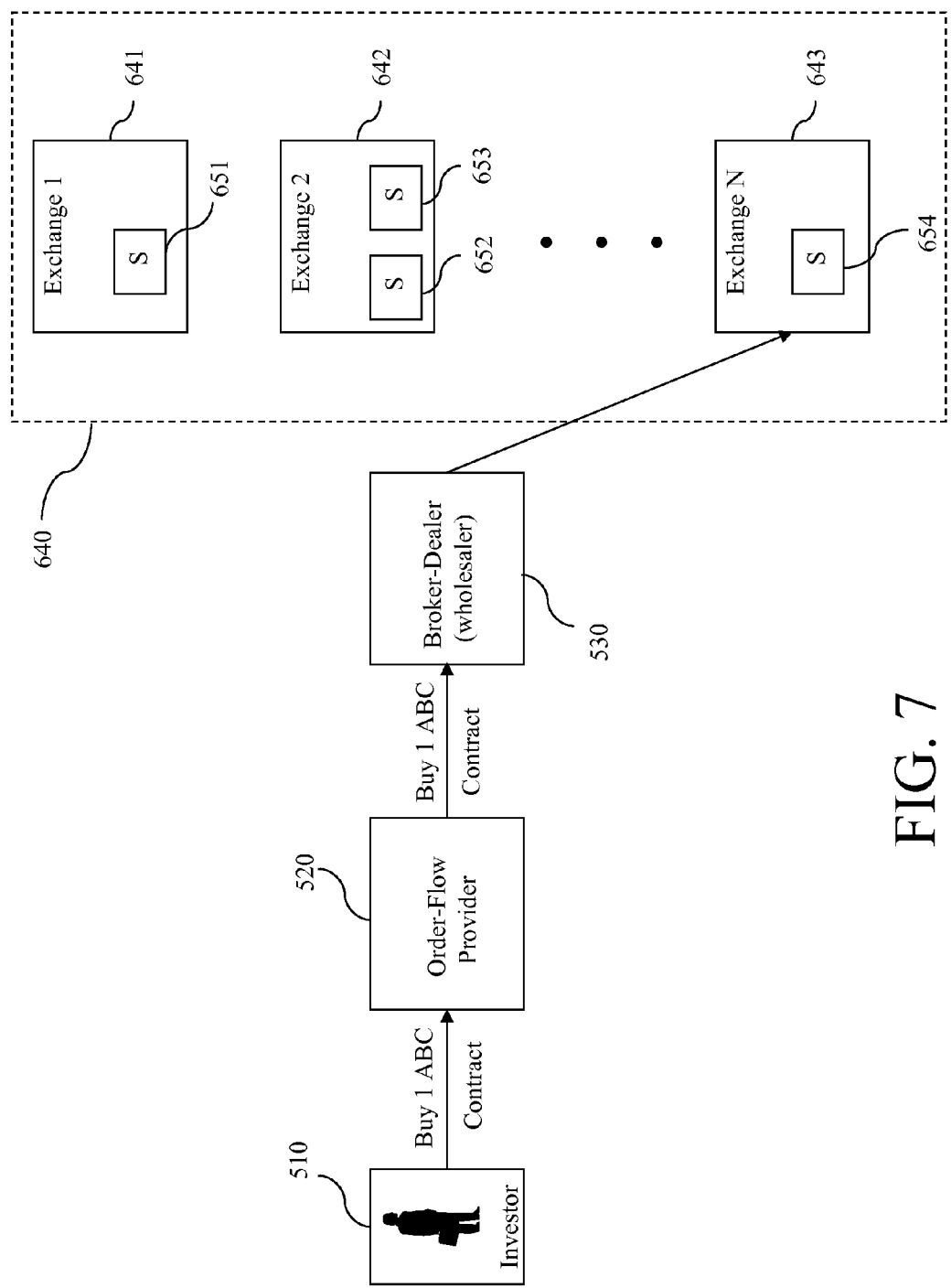
FIG. 7 shows an example of a pseudo-internalized transaction in the options market.

FIG. 7 shows an example of a pseudo-internalized transaction based on the order flow shown in FIG. 6. As shown, investor 510 submits an order to buy one ABC contract to OFP 520. OFP 520 then sends the order to broker-dealer 530. At this time, it is determined (e.g., by using a smart router as described in the Application) that specialist 654 on exchange 643 is a specialist for ABC options. Accordingly, the order is sent to exchange 643, where the order is either automatically executed, or specialist 654 fills the order within a guaranteed period of time according to its contractual obligations per its membership in the REC.

Figure 8:
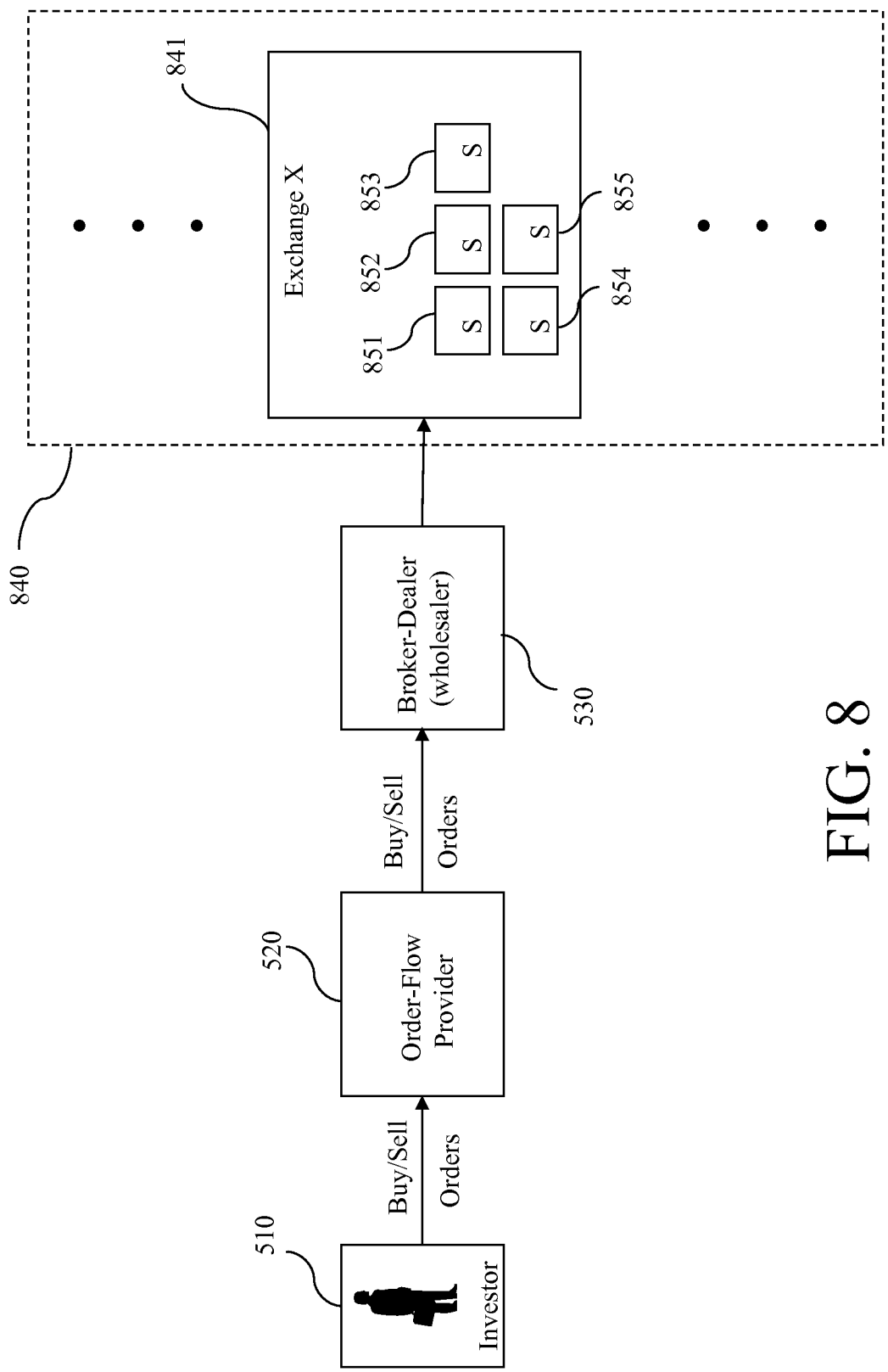
FIG. 8 is a simplified illustration of another example of a pseudo-internalization order flow in the options market.

It should be noted that, although the REC of FIGS. 6-7 includes four specialists from three separate exchanges, this is not required. For example, each of the specialists of the REC may be associated with the same exchange. For example, as shown in FIG. 8, all of the specialists (or other market-makers with step-up capability) of the REC may be associated with an exchange 841 of options market 840, such as the ISE. In this case, all orders received by consolidating broker-dealer 530 will be sent to exchange 841 to be filled via automatic execution or by an appropriate specialist 851, 852, 853, 854, or 855 (or a combination of these specialists), depending on the option(s) involved in the order.

While the above and possibly other methods address the issue of guaranteeing execution time for a listed options contract, a consolidating broker-dealer offering such a guarantee (along with, for example, a price guarantee) may be exposed to significant financial risk. For example, as explained above, professional traders may seek to take advantage of rapid order execution guarantees by monitoring for instances in which the NBBO reflects a "stale" quotation (e.g., a quotation that has not been updated to reflect current market conditions). In such instances, market participants may selectively send orders that are likely to be, or in fact turn out to be, toxic in order to obtain a guaranteed execution at a price that would not otherwise be readily available. Moreover, as explained above, consolidating broker-dealer may be exposed to financial risk even when not providing rapid execution guarantees (e.g., where an investor is trading based on insider information).

Therefore, according to the present invention, toxicity and profitability measurement methods and systems are provided which may be used, for example, to detect, track and respond to the level of toxic (or likely toxic) orders present in an options contract order flow. The concept of toxicity and the use of toxicity measurement methods and systems according to the invention are described in greater detail immediately below, followed by a detailed description of the use of profitability measurement methods and systems. Once again, it is noted that while the use of toxicity and/or profit analyzers is discussed in great detail with respect to the offering of rapid execution guarantees, the invention is not limited in this manner, and toxicity and/or profit analyzers may be used alone or in combination with other option contacts processes and/or systems.

As explained above, when not receiving orders directly from investor 510 (e.g., in the case of a full-service broker-dealer), consolidating broker-dealer 530 pays OFP 520 for providing a given volume of order flow. Moreover, when consolidating broker-dealer 530 takes an incoming order from OFP 520 and routes it to an exchange, it generally receives some form of payment from the exchange. On the other hand, the profit for consolidating broker-dealer 530 may be at least partially based on the spread between bid and offer prices for the option contract, for example, if an affiliated market-maker (or a market-maker of an affiliated market-making firm) handles the order.

In instances where a consolidating broker-dealer 530 offers, for example, a rapid order execution guarantee in a stale quote situation, regardless of what entity ultimately fills the order, the profitability of consolidating broker-dealer 530 is likely to suffer as a result of providing the guarantee. For example, when an affiliated market-maker and/or market-making firm of consolidating broker-dealer 530 is forced to take a loss on a guaranteed trade (based on previous contractual obligations), it is likely that this market-maker and/or market-making firm will seek compensation in one form or another from consolidating broker-dealer 530. As mentioned above, the orders that, if executed would result in no profit, reduced profit and/or a loss, are generally referred to herein as "toxic" orders.

It should be noted that, with a standard investing population, a certain level of toxic trades and/or trades that are suspect to be toxic may be tolerated and/or is to be expected due to the random arrival of orders in conjunction with the random movement of option bid and offer levels. With the professional investing population (e.g., professional traders), however, the level of toxic trades is likely to be increased as investors attempt to exploit inefficiencies in the options market structure (e.g., stale quotes in rapidly moving markets). Accordingly, it is particularly important to be able to limit the financial risk associated with the exploitation of stale quotes by the professional investing population.

While profit for consolidating broker-dealer 530 is determined generally via a post-execution measure (as explained below), we have determined that toxic orders are likely to have a set of common and/or predetermined characteristics at the order, market, and/or execution parameter levels which may provide either or both of consolidating broker-dealer 530 and OFP 520 with some level of predictive ability, thus enabling corrective action before an order is executed. Similarly, these common and/or predetermined characteristics may be used when deciding whether to take post order execution corrective action, for example, based on forensic characteristics associated with toxic orders. This has the potential, in turn, to improve the profitability of consolidating broker-dealer 530, which may also translate into higher profitability (e.g., higher per order payment) for OFP 520 for real-time order execution and/or subsequent order execution.

The invention recognizes that predetermined and/or specific orders (and ensuing associated trades) have a set of distinct characteristics that can be used to characterize their level of toxicity and thus provide broker-dealer 530 (or OFP 520) with some level of predictive capability, as described above. The variables which can be used to characterize toxicity can be derived from order parameters, market condition parameters, and/or order execution parameters. For example, the following order parameters can be used: the identity of the option (e.g., symbol), the action type (e.g., buy or sell), the position type (e.g., open or close), the option contract type (e.g., put or call), the order type (e.g., market, limit, stop, all-or-none), the limit price (e.g., for a limit order), and the order size (e.g., the number of contracts involved in the order). In addition, the following market condition parameters can be considered with respect to the ordered option contract: the theoretical value of the contract, the frequency of order submission, the NBBO market source, the NBBO size, the liquidity of the option in the market, the liquidity of the underlying equity, the implied spread (NBBO), option price sensitivity measures (e.g., the "greeks"—delta, gamma, lambda, rho, theta, and vega), and the implied option price volatility. Moreover, the following execution parameters can be considered: the fill spread (e.g., the bid/offer spread at the time of filling the order) and the fill price. The invention is not limited by the particular characteristics that are examined in this regard, and any other distinct characteristic may be used alone and/or in combination with any or all of the above mentioned parameters in accordance with the principles of the present invention.

According to at least one embodiment of the invention, some or all of the above and other order and/or market condition and/or execution parameters may be combined empirically to generate a "toxicity quotient" for orders placed by investor 510. For example, consolidating broker-dealer 530 (or another participant in the options order flow) may generate toxicity quotients by measuring order, market condition, and/or execution parameters of various orders over time, and correlating these parameters with the outcome of trades (e.g., stale quote trades yielding a loss compared with normal profitable trades). Moreover, various order characteristics of a received (but not yet executed) order may be compared to previously received (and potentially executed) orders in order to determine such a toxicity quotient. It should be noted that, while consolidating broker-dealer 530 may be the generator of a toxicity quotient, the invention is not limited in this manner. In particular, it is contemplated that toxicity quotients may be generated (e.g., using similar order parameters to those described above) by other than consolidating broker-dealer 530. In this case, according to various embodiments of the present invention, consolidating broker-dealer 530 would receive one or more toxicity quotients subsequent to their generation by other entities. It should also be noted that, according to at least one embodiment, a previously generated toxicity quotient may be modified. For example, toxicity quotients may be dynamically modified based on events occurring after their initial generation.

Using these toxicity quotients (regardless of where they are generated), an order may be examined to determine the likelihood that it is toxic if executed with and/or without a rapid execution guarantee. In this manner, it is possible to greatly reduce the number of trades that are executed at a loss (or no profit), while, for example, in at least one embodiment, still offering a rapid execution guarantee.

As demonstrated by the various embodiments of the invention described below, toxicity quotients may be useful for a number of different parties in the options order-flow chain. For example, consolidating broker-dealer 530 may use order-by-order or aggregate toxicity quotient measurements to characterize the quality of individual orders received from OFP 520. This information can be used, for example, to take corrective action to improve the profitability of consolidating broker-dealer 530 on a per order basis and/or aggregate order basis (e.g., by rejecting potentially toxic orders), or in negotiations concerning payment for order flow to OFP 520 (e.g., higher payment for lower toxicity order flow). OFP 520 may use order-by-order, aggregate and/or per account toxicity quotient measurements, for example, to reject potentially toxic orders, to take corrective action against particular users who are submitting unacceptably high levels of orders that are likely to be toxic and/or provide post order analysis with respect to order execution and/or future orders. For example, investor 510 may be charged a higher commission based on the determination that a submitted order is likely to be toxic (based on an analysis of the order, market and/or execution parameters). Moreover, knowledge of an order's likelihood of toxicity would allow investor 510 to reconsider an order prior to submission if the order would result in a higher than usual fee (commission).

It will be understood that, when toxicity detection and/or prediction such as described herein is not in place, it is possible that all orders (including normal and potentially toxic orders, whether or not they seek rapid execution guarantees) that flow through the option market order flow will be provided a rapid execution guarantee and/or be executed. Upon execution of normal orders (with or without a guarantee in place), broker-dealer 530 would likely record a trading profit (on average), while upon execution of toxic orders (with or without a guarantee in place), a reduction in trading profit or a loss would likely result (either directly, or as a result of having to reimburse another entity for taking a trading loss).

Figure 9:
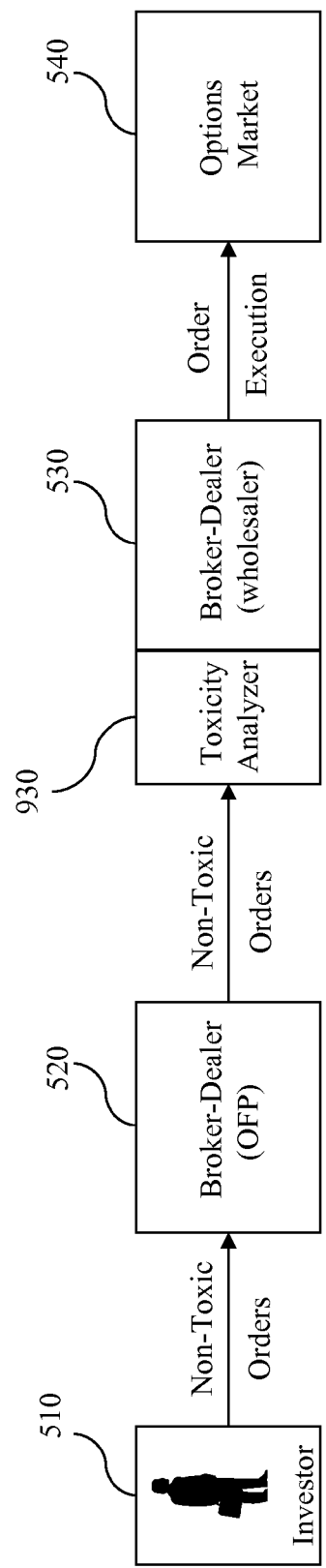
FIG. 9 is a simplified illustration of one example of an order flow in the options market in which a toxicity analyzer is used according to principles of the present invention.

FIG. 9 shows an illustrative embodiment of the present invention in which consolidating broker-dealer 530 uses a toxicity analyzer 930 to track received orders and/or to determine whether (and if so, on what terms) an order should be filled with a rapid order execution (e.g., one second) guarantee. For example, toxicity analyzer 930 may be used to "screen-out" orders that fit certain criteria characteristic of toxic orders. In other words, for example, if an order is determined to be eligible for rapid execution based on its order characteristics (because it is not likely to be a toxic order), it will be executed within the guaranteed, specified and/or predetermined time and/or price. Similarly, if an order is determined to be eligible for execution without any guarantee in place (e.g., because the order is ineligible to receive a guarantee, or consolidating broker-dealer 530 does not provide guarantees under any circumstances), the order will be executed under normal execution guidelines. Because the orders received are considered "non-toxic" in the order flow shown in FIG. 9, they are executed (e.g., with a rapid execution guarantee). Toxicity analyzer 930 comprises any standard software program or programs that can be used to analyze the orders with respect to toxicity as described in the various embodiments of the present invention.

Figure 10:
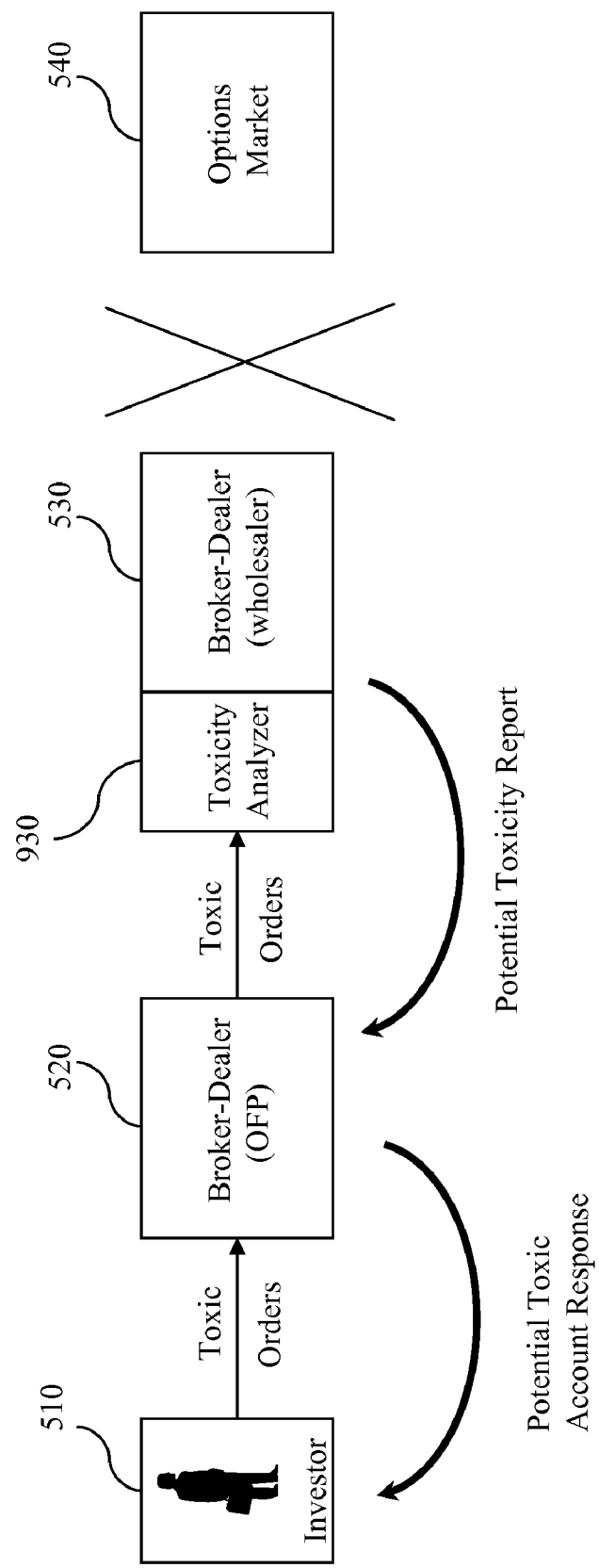
FIG. 10 is a simplified illustration of one example of an order flow in the options market in which a toxicity analyzer is used according to principles of the present invention.

As shown in FIG. 10, in at least one embodiment, orders received and examined by toxicity analyzer 930 that are determined to be likely toxic (based on an examination of their order parameters) are not offered a rapid execution guarantee (or are completely rejected). Alternatively, for example, investor 510 may be given a choice to cancel any ineligible orders, or to agree to their execution without a time and/or price guarantee and/or for an increased fee (commission). In addition, as shown in FIG. 10, consolidating broker-dealer 530 may optionally, upon the finding of ineligibility of one or more orders by toxicity analyzer 930, provide a toxicity report to OFP 520. As explained in greater detail below, this report may include, for example, necessary information to identify investor 510 as an investor that submitted one or more orders that are likely to be toxic. In turn, OFP 520 may take corrective action against an investor 510 that is determined to have submitted one or more toxic orders (as also explained in greater detail below). It should be noted that, generally speaking and in at least one embodiment, it would not be desirable to take corrective action against an investor 510 who is determined to be a "naïve" offender. In other words, simply because an investor 510 submits one or more orders that are likely to be toxic (or that in fact turn out to be toxic), it is not necessarily desirable to provide a toxicity report and/or to take corrective action. Rather, these steps are generally intended to be taken in the case of an investor 510 who continuously submits orders that are in fact, or likely to be, toxic, and/or submits one or more toxic orders for which the trading loss is substantial (a "highly toxic" order). The invention, however, is not limited by the particular situations in which a toxicity report is sent or in which corrective action is taken.

Regardless of whether incoming orders are determined by toxicity analyzer 930 to be toxic, according to various embodiments of the present invention, consolidating broker-dealer 530 may still provide OFP 520 a pre-negotiated, per-order level of payment for order flow. According to various other embodiments, such as described below, the payment provided by consolidating broker-dealer 530 to OFP 520 may be at least in part based on the quality (e.g., toxic versus non-toxic) of orders received.

Figure 11:
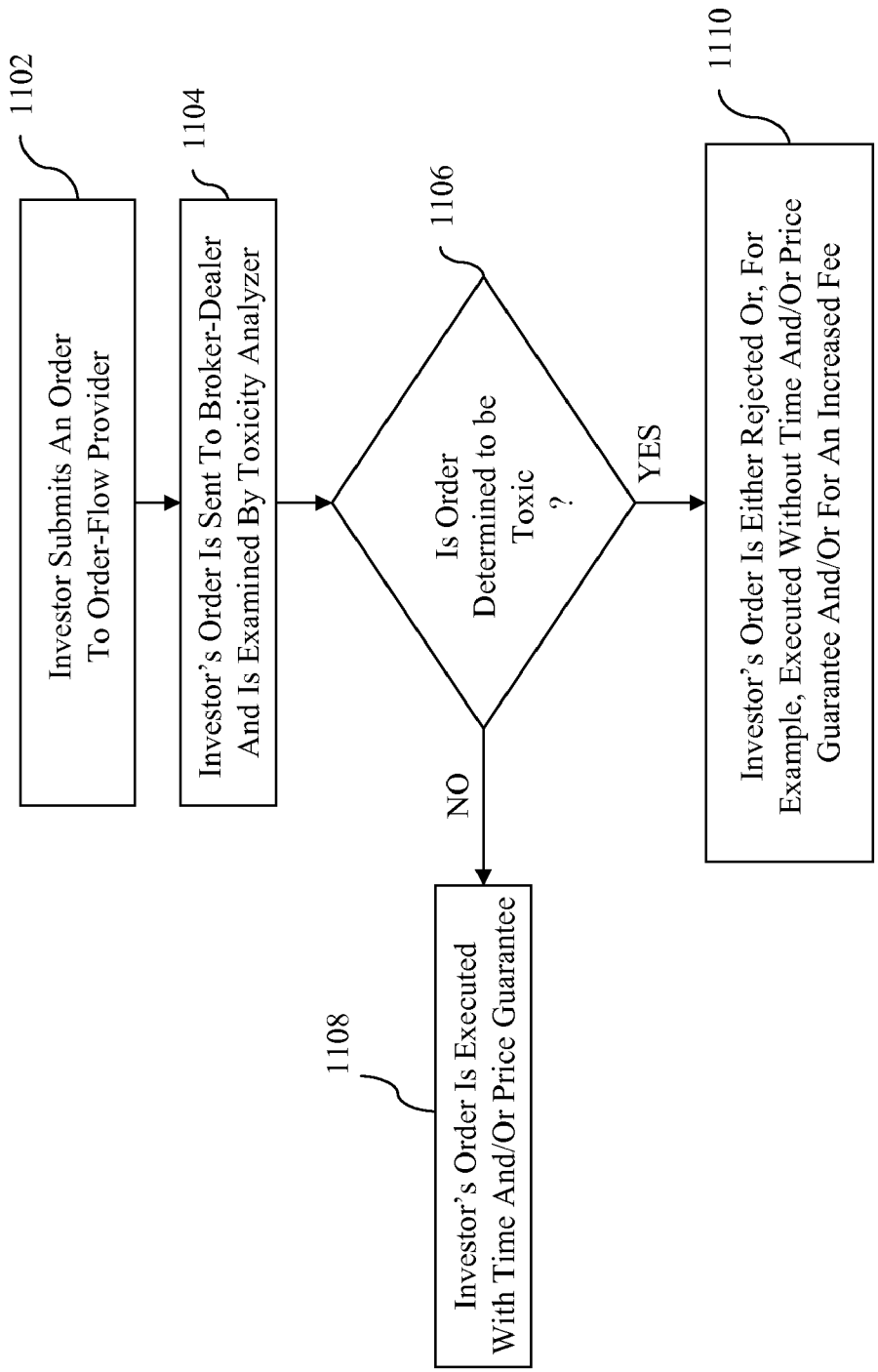
FIG. 11 is a simplified flow chart illustrating the steps performed in the execution of an investor's options order according to one embodiment of the present invention.

FIG. 11 is a simplified flow chart illustrating the steps performed in the execution of an investor's options order according to the embodiment of the present invention shown in FIGS. 9-10. In step 1102, investor 510 submits an order (e.g., to buy or sell one or more options contracts) to OFP 520. Next, in step 1104, the order is sent by OFP 520 to consolidating broker-dealer 530, at which time it is examined by toxicity analyzer 930. If it is determined at step 1106 that the order submitted by investor 510 is not toxic, the order is executed (e.g., with a rapid execution guarantee, such as a time guarantee). Otherwise, if the order is determined to be toxic at step 1106, at step 1110, the order submitted by investor 510 is either rejected or, for example, it is executed without a rapid execution guarantee and/or for an increased fee (commission).

Figure 12:
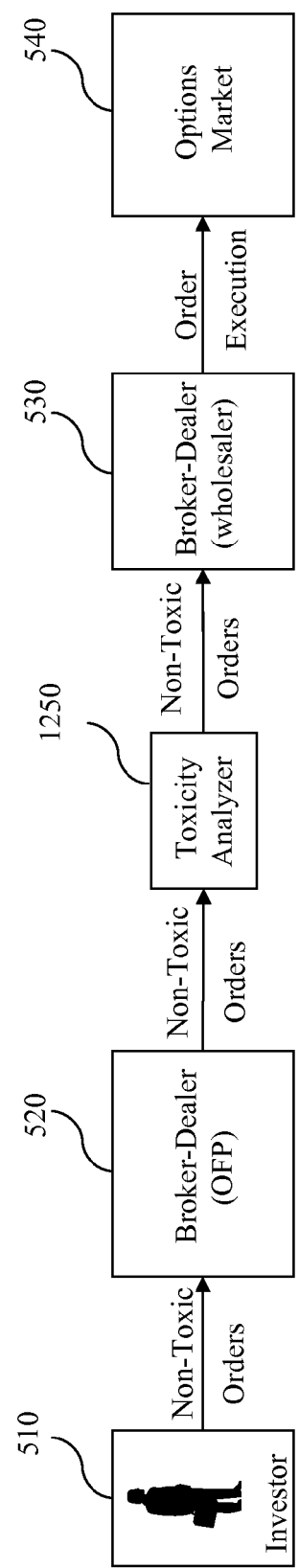
FIG. 12 is a simplified illustration of one example of an order flow in the options market in which a toxicity analyzer is used according to principles of the present invention.
Figure 13:
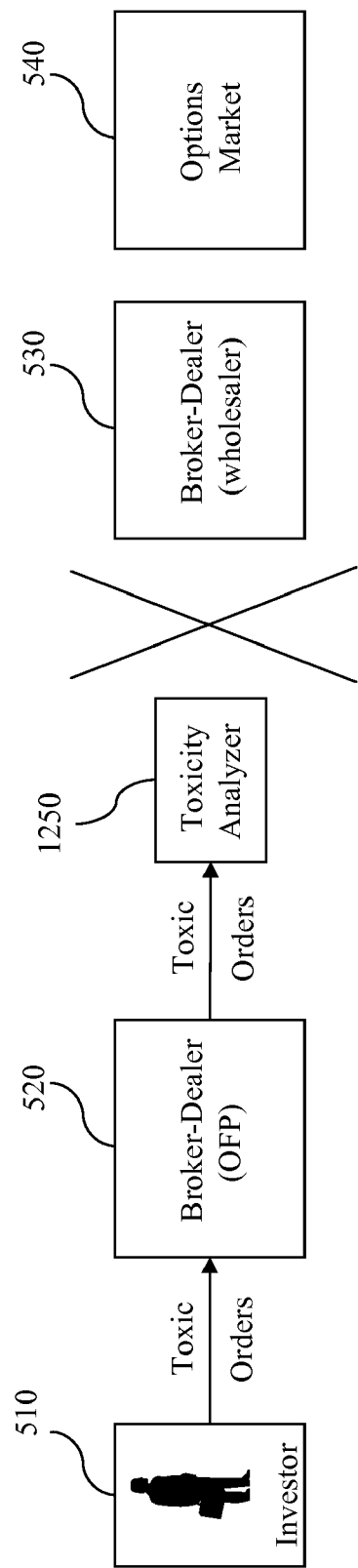
FIG. 13 is a simplified illustration of one example of an order flow in the options market in which a toxicity analyzer is used according to principles of the present invention.
Figure 14:
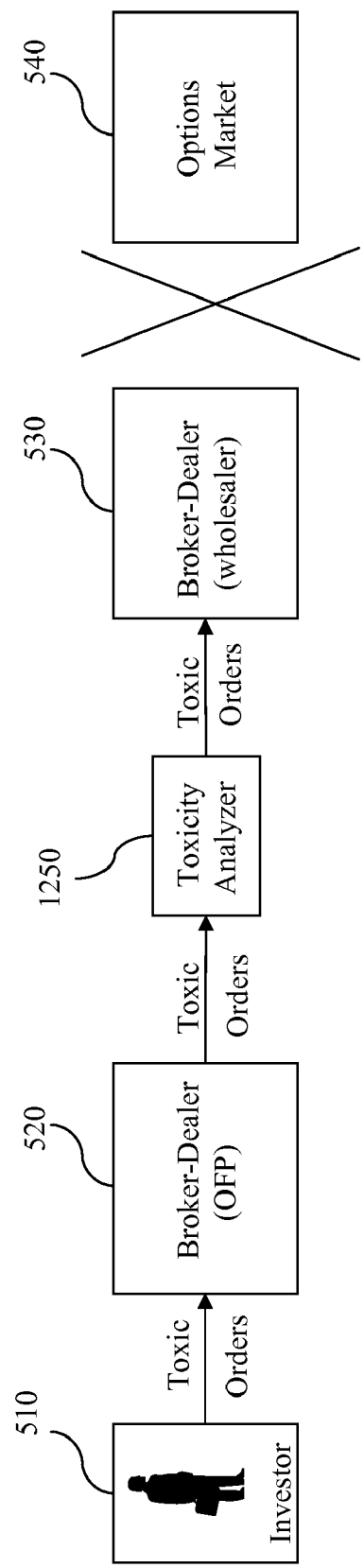
FIG. 14 is a simplified illustration of one example of an order flow in the options market in which a toxicity analyzer is used according to principles of the present invention.

In the embodiments of the invention shown in FIGS. 9-10, toxicity analyzer 930 is a part of (e.g., owned by the same entity as) consolidating broker-dealer 530. The invention, however, is not limited in this manner. For example, a stand alone toxicity analyzer may be used according to the invention. In this case, the toxicity analyzer may be, for example, completely independent from, or associated with (e.g., under the control of), consolidating broker-dealer 530. FIG. 12 shows one example of an order flow in which such a stand alone toxicity analyzer 1250 is used. As shown, non-toxic orders submitted by investor 510 (and sent by OFP 520) are received by toxicity analyzer 1250, and are thereafter submitted for execution, optionally with a rapid execution guarantee, by consolidating broker-dealer 530. When toxicity analyzer 1250 determines that one or more received orders are likely to be toxic, and are ineligible for the rapid execution guarantee (and/or ineligible for execution even without a guarantee in place), as shown in FIG. 13, the orders are not submitted to consolidating broker-dealer 530. Alternatively, as shown in FIG. 14, the orders deemed likely toxic may nonetheless be passed to consolidating broker-dealer 530. In this case, however, based on instructions from toxicity analyzer 1250 (or from some other entity, but still based, at least in part, on the determination by toxicity analyzer 1250), consolidating broker-dealer 530 will generally not provide a rapid execution guarantee to the order as submitted by investor 510. In this case, as mentioned above, the order may, for example, be either rejected, filled without a rapid execution guarantee, filled with a partial guarantee and/or filled for a higher fee (commission). Although not indicated in FIGS. 13-14, it will be understood that, as described above in connection with FIG. 10, a toxicity report may be provided to OFP 520 in response to the detection of toxic orders, and OFP 520 may take corrective action against an investor 510 that is determined to have submitted one or more toxic orders.

Figure 15:
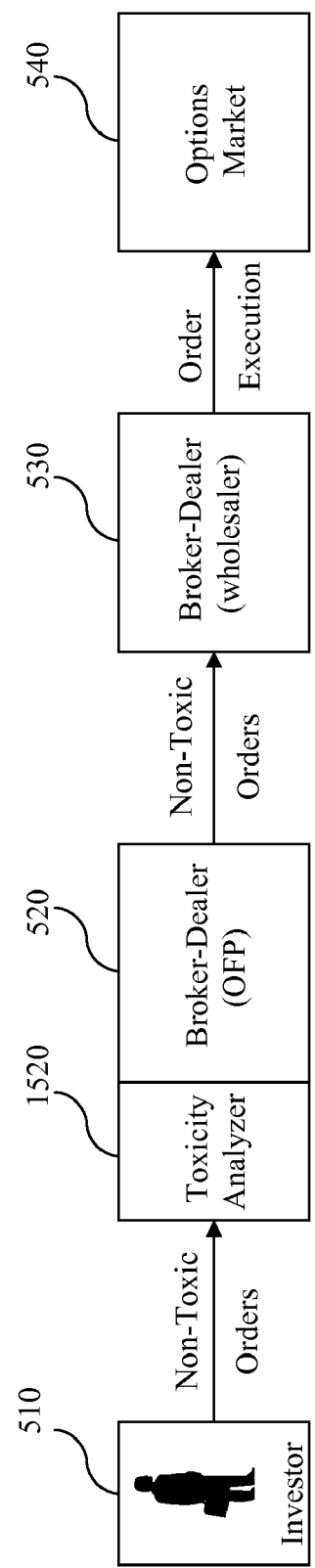
FIG. 15 is a simplified illustration of one example of an order flow in the options market in which a toxicity analyzer is used according to principles of the present invention.

As shown in FIG. 15, according to another embodiment of the invention, a toxicity analyzer 1520, which is a part of OFP 520, may be used in place of, and/or in combination with, toxicity analyzers 930 and 1250 shown in FIGS. 9-10 and 12-14, respectively, and described above. In this manner, by using toxicity analyzer 520, it is possible to examine some or all orders being sent to OFP 520 for potential toxicity (and potentially cancel or modify the orders) before they are sent to consolidating broker-dealer 530. As shown in FIG. 15, non-toxic orders are eventually received by consolidating broker-dealer 530, and are generally executed with a rapid execution guarantee.

Figure 16:
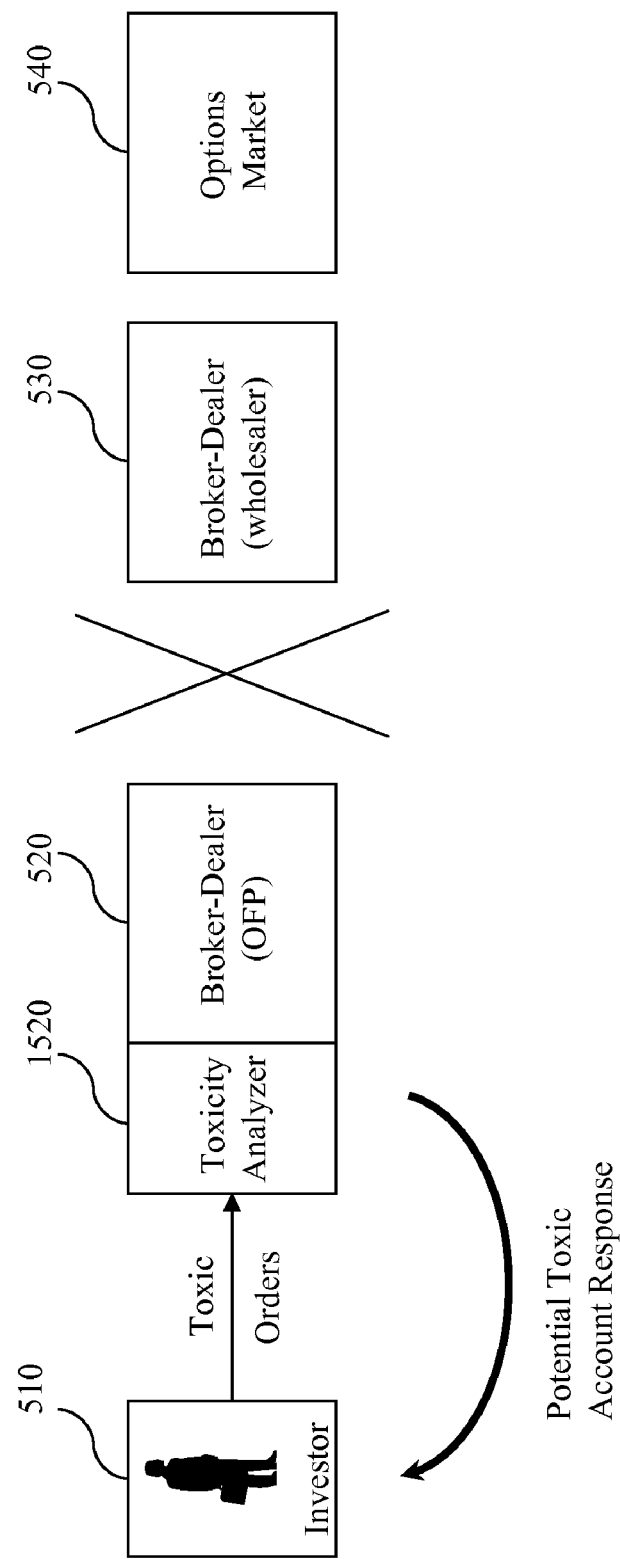
FIG. 16 is a simplified illustration of one example of an order flow in the options market in which a toxicity analyzer is used according to principles of the present invention.

As shown in FIG. 16, orders received and examined by toxicity analyzer 1520 that are determined to be ineligible for rapid order execution (and/or ineligible for execution even without a guarantee in place) based on their order characteristics are not provided to consolidating broker-dealer 530. Alternatively, for example, investor 510 may be given a choice to either cancel any ineligible orders, or, when provided the option, to agree to their execution without a time and/or price guarantee and/or for an increased fee (commission). In this case, although not shown in FIG. 16, the orders may be provided to consolidating broker-dealer 530 for execution according to the new terms. In addition, as shown in FIG. 16, OFP 520 may take corrective action against an investor 510 that is determined to have submitted one or more toxic orders (as also explained in greater detail below). According to various embodiments, regardless of whether incoming orders are passed on to consolidating broker-dealer 530 or rejected due to suspected toxicity, consolidating broker-dealer 530 may still provide OFP 520 a pre-negotiated per-order level of payment. According to various other embodiments, such as described below, the payment provided by consolidating broker-dealer 530 to OFP 520 may be at least in part based on the quality (e.g., toxic versus non-toxic) of orders received.

Figure 17:
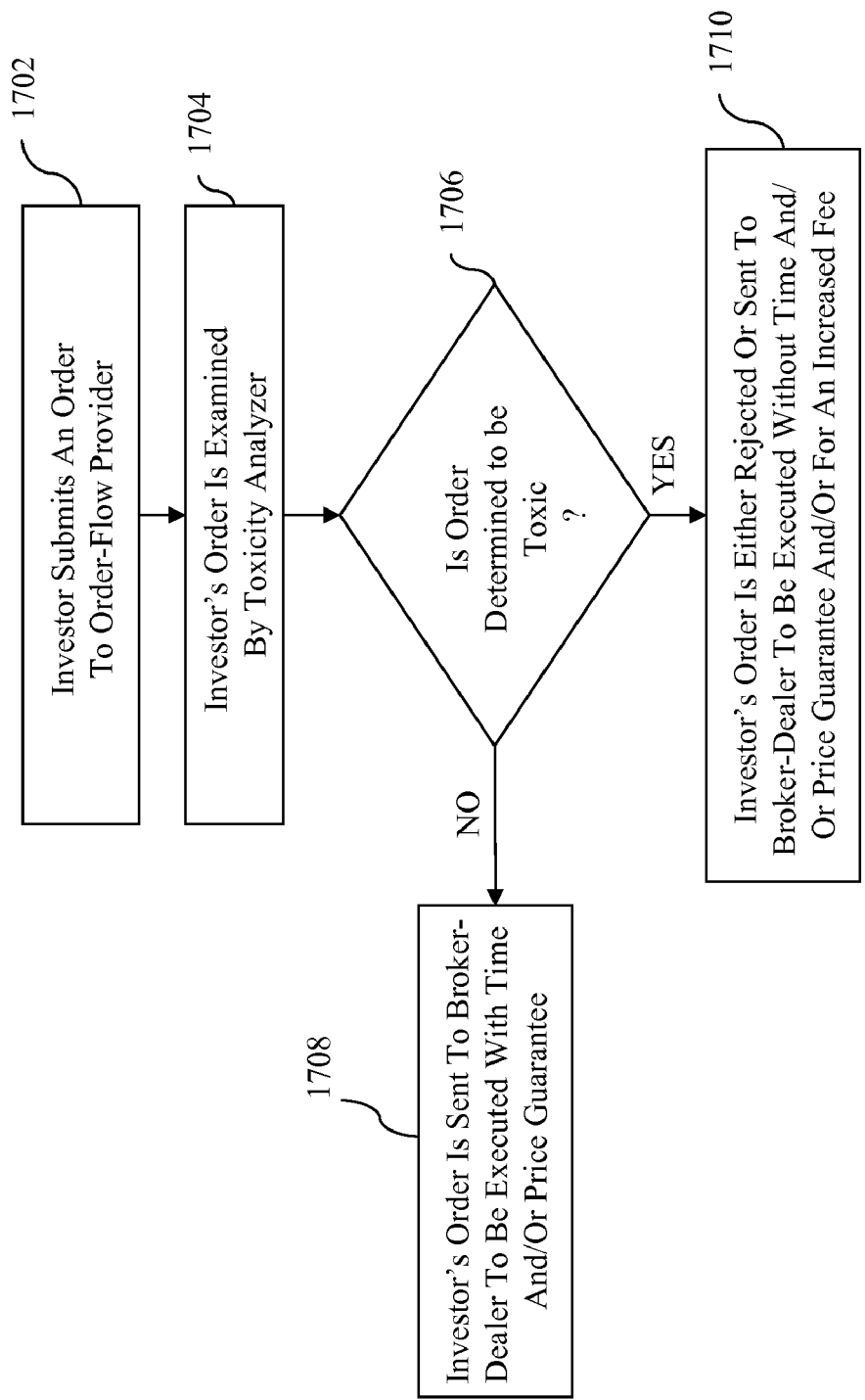
FIG. 17 is a simplified flow chart illustrating the steps performed in the execution of an investor's options order according to another embodiment of the present invention.

FIG. 17 is a simplified flow chart illustrating the steps performed in the execution of an investor's options order according to the embodiment of the present invention shown in FIGS. 15-16. In step 1702, investor 510 submits an order (e.g., to buy or sell a contract of options) to OFP 520. Next, in step 1704, the order is examined by toxicity analyzer 1520. If it is determined at step 1706 that the order submitted by investor 510 is not toxic, the order may be sent to consolidating broker-dealer 530 to be executed (e.g., with a rapid execution guarantee, such as a time guarantee). Otherwise, if the order is determined to be toxic at step 1706, at step 1710, the order submitted by investor 510 is either rejected or, for example, it is sent to consolidating broker-dealer 530 to be executed without a time and/or price guarantee and/or for an increased fee (commission).

Figure 18:
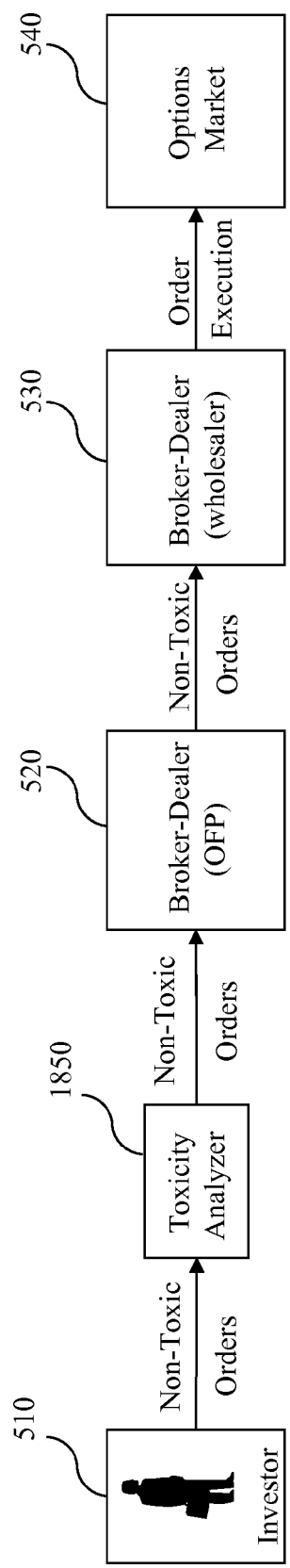
FIG. 18 is a simplified illustration of one example of an order flow in the options market in which a toxicity analyzer is used according to principles of the present invention.
Figure 19:
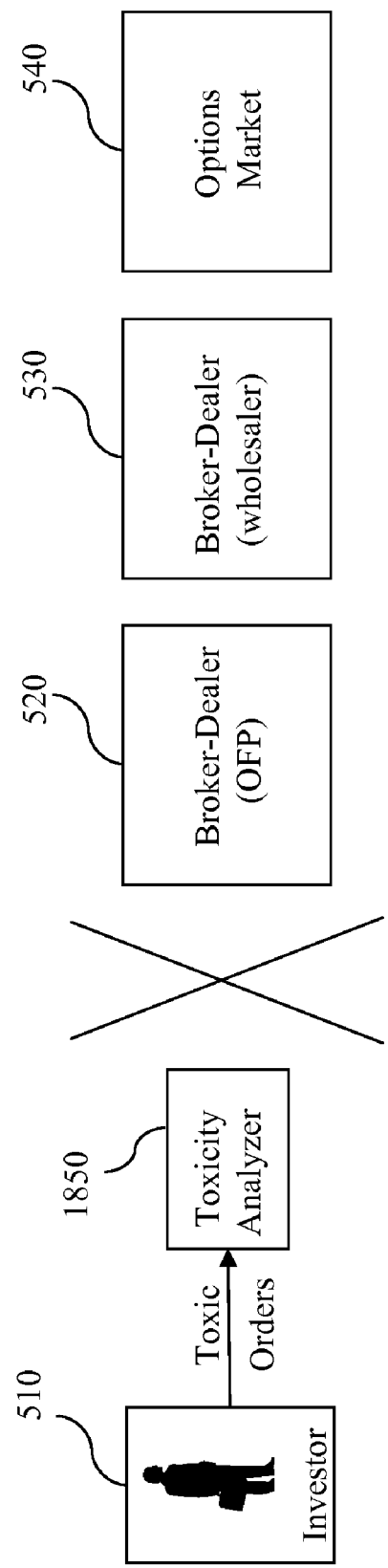
FIG. 19 is a simplified illustration of one example of an order flow in the options market in which a toxicity analyzer is used according to principles of the present invention.
Figure 20:
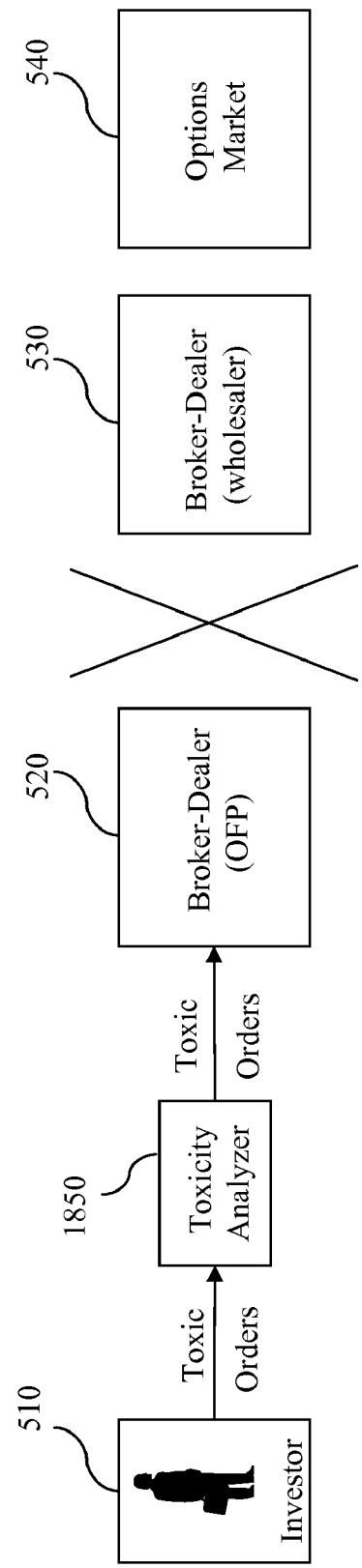
FIG. 20 is a simplified illustration of one example of an order flow in the options market in which a toxicity analyzer is used according to principles of the present invention.

In the embodiments of the invention shown in FIGS. 15-16, toxicity analyzer 1520 is a part of (e.g., owned by the same entity as) OFP 520. The invention, however, is not limited in this manner. For example, a stand alone toxicity analyzer situated between investor 510 and OFP 520 may be used according to the invention. In this case, the toxicity analyzer may be, for example, completely independent from, or associated with (e.g., under the control of), OFP 520. FIG. 18 shows one example of an order flow in which such a stand alone toxicity analyzer 1850 is used that is situated between investor 510 and OFP 520. As shown, non-toxic orders submitted by investor 510 are received by toxicity analyzer 1850, and are thereafter submitted for execution (e.g., with a rapid order guarantee to consolidating broker-dealer 530). When toxicity analyzer 1850 determines that one or more received orders are not eligible for a rapid execution guarantee, or not eligible for execution even without a guarantee in place (e.g., because they are toxic), as shown in FIG. 19, the orders are not submitted to OFP 520. Alternatively, as shown in FIG. 20, the orders deemed ineligible for rapid order execution (or ineligible for execution even without a guarantee in place) may nonetheless be passed to OFP 520. In this case, however, based on instructions from toxicity analyzer 1850 (or from some other entity, but still based on the determination by toxicity analyzer 1850), OFP 520 generally does not provide a rapid execution guarantee to the order as submitted by investor 510. In this case, as mentioned above, the order may be either rejected, or filled without a rapid execution guarantee and/or for a higher fee (commission). Moreover, although not indicated in FIGS. 19-20, as described above in connection with FIG. 16, OFP 520 may take corrective action against an investor 510 that is determined to have submitted one or more toxic orders.

The present invention also provides profitability measurement methods and systems that may be used to eliminate, or at least reduce, the financial risk associated with offering rapid order execution guarantees. As explained above, the profit which consolidating broker-dealer 530 makes on the execution of a given option order may be at least partially dependent on the spread between the bid and offer quotes (e.g., when an affiliated specialist is filling the order). Moreover, as previously noted, there may be instances when this profit (for consolidating broker-dealer 530 and/or another participant in the options order flow) is reduced, approaches zero, and/or when losses are sustained. According to the present invention, broker-dealer profit information coupled with market condition information (either instantaneous or averaged over some time period) can be used to characterize the quality of an individual order or flow of orders. Moreover, while profit (or loss) on a trade can only be determined after a trade has been executed, and thus a profit measure could not be used to stop the execution of unprofitable orders, it could have tremendous utility in motivating behaviors at the OFP or investor level by providing a parameter to drive the setting of transaction (e.g., payment for order flow) and investor commission fees. For example, a profit analyzer according to the invention may be used to monitor the outcome of some or all trades that are received by a consolidating broker-dealer and that are subsequently executed. By logging the bid/offer spread at the time of order filling for each option trade executed, a running tab of profit (or loss) can be kept. Moreover, by monitoring average trading volume and average per trade-profit over various periods of time (days, weeks, or months), an expected level of profit can be established for various OFPs. Deviations from these averages could then be used to signal the need to take corrective action against a particular OFP or investor (e.g., to adjust payment for order flow to the OFP).

Figure 21:
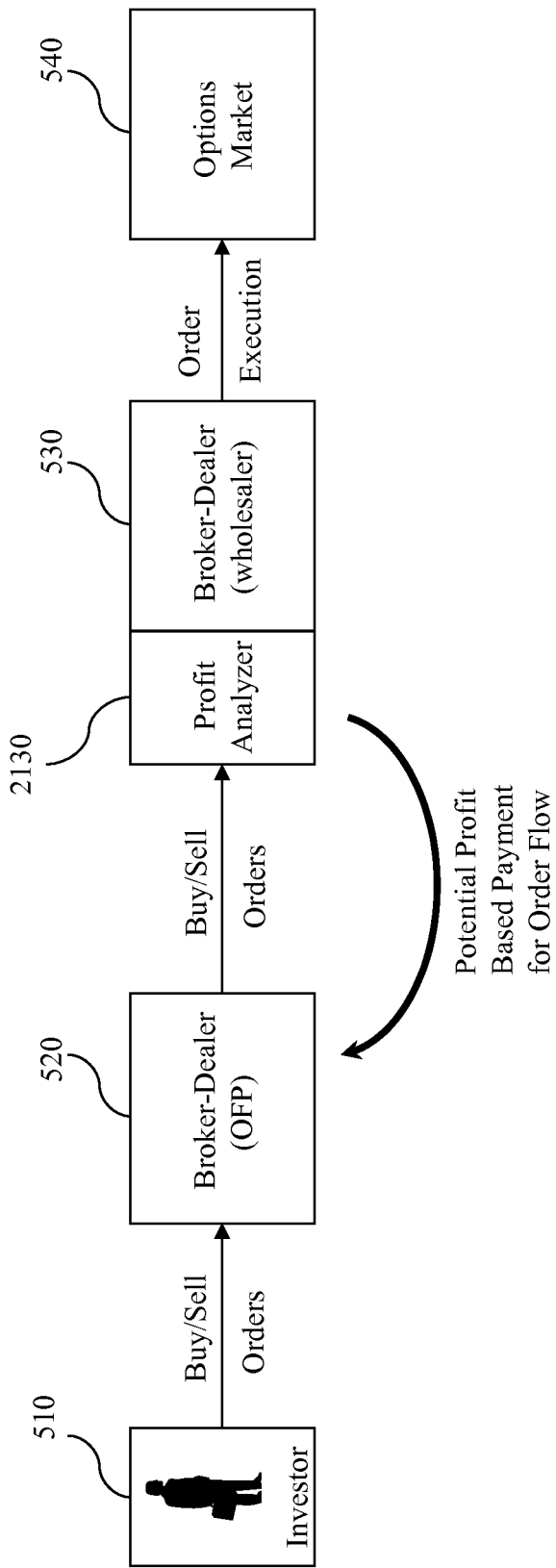
FIG. 21 is a simplified illustration of one example of an order flow in the options market in which a profit analyzer is used according to principles of the present invention.

FIG. 21 shows an order flow in which a profit analyzer 2130 is used according to another embodiment of the invention. In this embodiment, optionally, execution (with or without an order execution guarantee) is provided to a majority (or all) of the received orders from investor 510. Moreover, the fee structure with OFP 520 is based on a measure of profitability for consolidating broker-dealer 530. By using profit analyzer 2130 to monitor all (or at least a percentage of) executed trades in which consolidating broker-dealer 530 is involved, it is possible for consolidating broker-dealer 530 to track its level of profitability (e.g., in real-time, and/or over a certain period of time). By making the amount of payment provided to OFP 520 in exchange for order flow variable and a function of the profit ultimately realized by consolidating broker-dealer 530, at least some of the risk for loss (e.g., based on stale quotes) may be shifted to OFP 520. This shifting of risk in turn aligns the objectives of OFP 520 with those of consolidating broker-dealer 530 (e.g., lower toxicity order flow results in greater profit for OFP 520).

Although FIG. 21 shows profit analyzer 2130 as being a part of (e.g., owned by the same entity as) consolidating broker-dealer 530, the invention is not limited in this manner. For example, although not shown, a stand alone profit analyzer may be used according to other embodiments of the invention. In this case, the profit analyzer may be, for example, completely independent from, or associated with (e.g., under the control of), consolidating broker-dealer 530.

Figure 22:
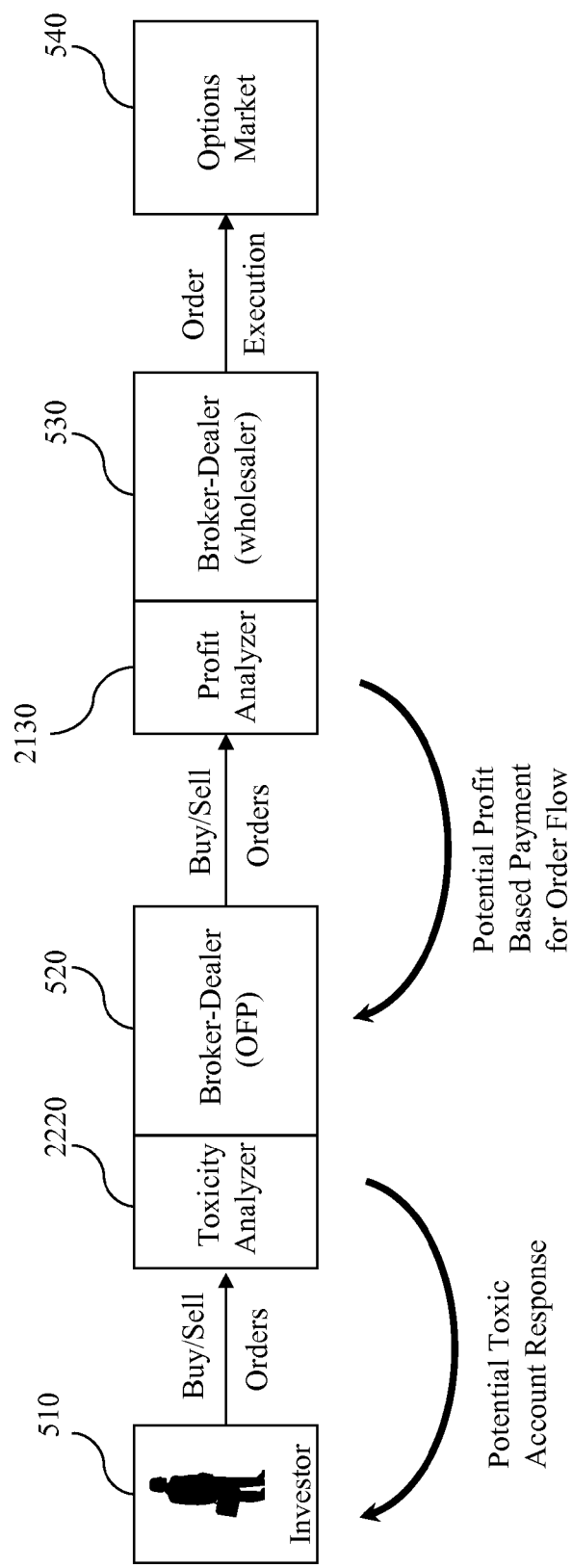
FIG. 22 is a simplified illustration of one example of an order flow in the options market in which a toxicity analyzer and a profit analyzer are used according to principles of the present invention.

As shown in FIG. 22, according to another embodiment of the present invention, both a toxicity analyzer 2220 and profit analyzer 2130 may be used in the same order flow. In this case, as described above in connection with FIG. 21, profit analyzer 2130 is used to track the execution of each trade received by consolidating broker-dealer 530, monitoring the real-time and/or aggregate level of profitability. Accordingly, it is possible for the payment from consolidating broker-dealer 530 to OFP 520 to be variable and based on the profit realized by the order flow received by consolidating broker-dealer 530. Moreover, using toxicity analyzer 2220 (or another toxicity analyzer which may be, for example, a stand alone toxicity analyzer), orders, which are determined to be likely toxic, may be rejected by OFP 520, or modified, as described above. In addition, based on the toxic orders received from investor 510 (regardless of whether they are actually executed), OFP 520 may take corrective action against investor 510. For example, OFP 520 may increase the transaction fees for orders placed by investor 510, ban investor 510 altogether from trading through OFP 520, or restrict the orders that will be accepted from investor 510 (e.g., based on order size, symbol, etc.).

Figure 23:
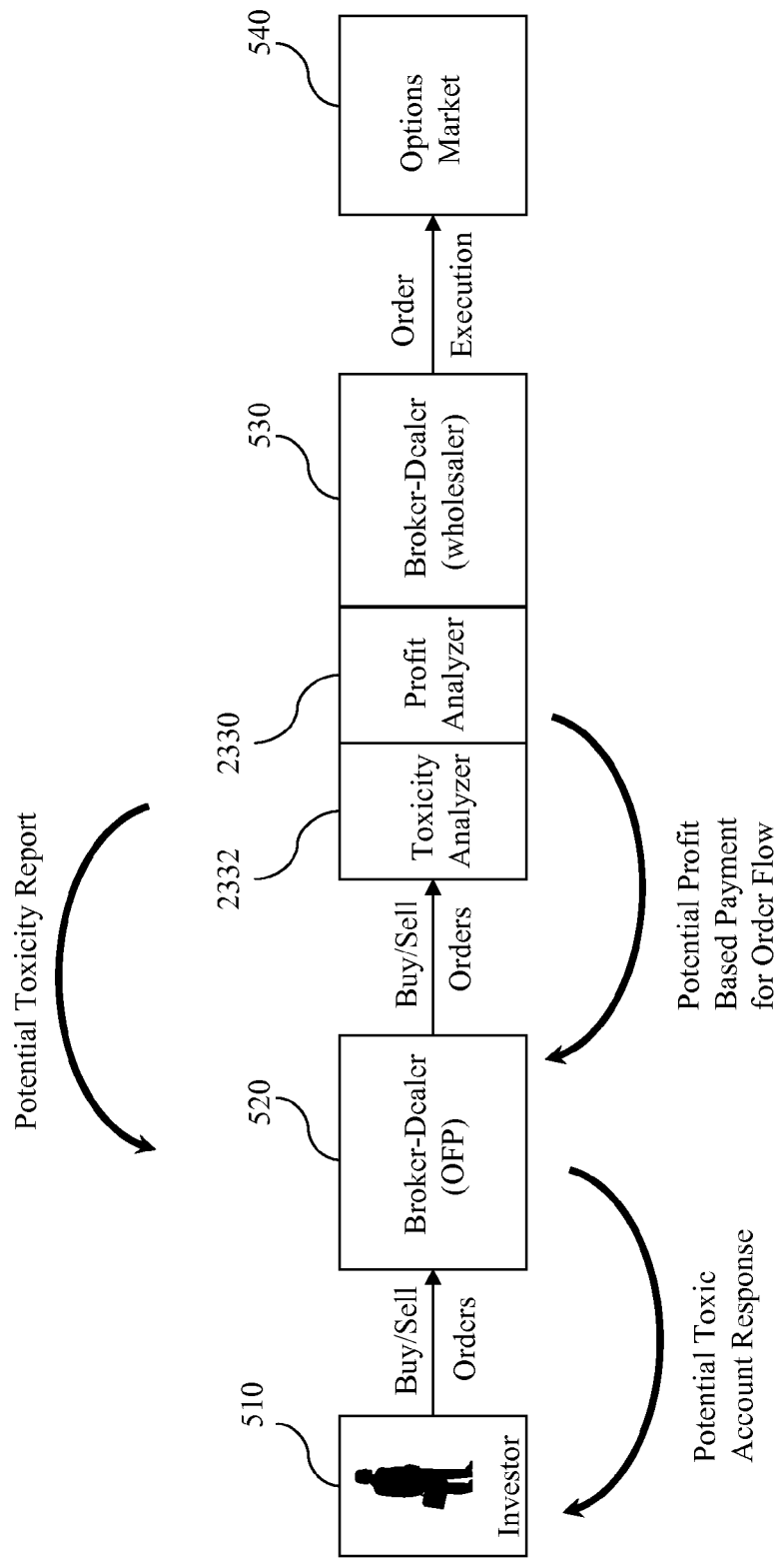
FIG. 23 is a simplified illustration of one example of an order flow in the options market in which a toxicity analyzer and a profit analyzer are used according to principles of the present invention.

FIG. 23 shows another embodiment of the invention in which a profit analyzer 2330 and toxicity analyzer 2332 are used in the same order flow. As with profit analyzer 2130 of FIG. 22, profit analyzer 2330 is used to track the execution of each trade received by consolidating broker-dealer 530, monitoring the real-time and/or aggregate level of profitability. Accordingly, it is possible for the payment from consolidating broker-dealer 530 to OFP 520 to be variable and based on the profit realized by the order flow received by consolidating broker-dealer 530. Moreover, using toxicity analyzer 2332 (or another toxicity analyzer which may be, for example, a stand alone toxicity analyzer), orders which are determined to be toxic may be rejected by consolidating broker-dealer 530, or modified, as described above. In addition, following the receipt of one or more orders determined to be likely toxic (regardless of whether they are actually executed and found to be actually toxic), consolidating broker-dealer 530 may provide a toxicity report to OFP 520. This report may include necessary information to identify investor 510 as an investor that submitted one or more likely (or actually) toxic orders. For example, this information may include the account number of the offending investor (if available to consolidating broker-dealer 530), the encoded account number (if OFP 520 provides consolidating broker-dealer 530 with an identification code that can be used by OFP 520 to identify the underlying account), and/or the order number (if OFP 520 keeps track of which order numbers are associated with which underlying accounts). In turn, OFP 520 may take corrective action against an investor 510 that is determined to have submitted one or more likely (or actually) toxic orders. As explained above, this may include, so long as otherwise consistent with applicable securities regulation, increasing the transaction fees for orders placed by investor 510, banning investor 510 altogether from trading through OFP 520, or restricting the orders that will be accepted from investor 510 (e.g., based on order size, symbol, etc.).

According to various alternate embodiments of the invention, a set of rules ("rule-set") may be used in conjunction with, or in place of, one or more order toxicity analyzers such as the ones shown in FIGS. 9-10, 12-16, 18-20, and 22-23 and described above. For example, as shown in the illustrative order flow of FIG. 24, it is determined by system 2450 for all and/or predetermined orders arriving from OFP 520 whether the order conforms to the rule-set (e.g., the size of the order is below a threshold level, the investor submitting the order is one of a pre-approved list of investors, etc.). It will be understood that the rule-set described above may be modified at any suitable time. For example, the rule-set may be modified based on past, present, or expected future market conditions, past profit measurements, and/or other received information (e.g., from outside the options order flow). Moreover, it should be noted that the order flow shown in FIG. 24 is substantially the same as the order flow shown in FIG. 9, except that toxicity analyzer 930 is replaced by system 2450.

Figure 24:
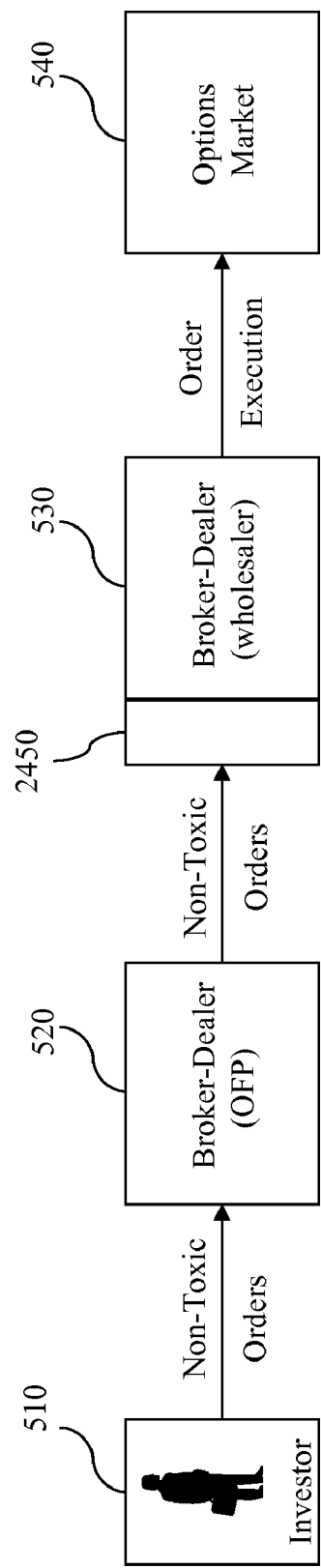
FIG. 24 is a simplified illustration of one example of an order flow in the options market in which a system for determining whether an order conforms to a rule-set is used according to the principles of the present invention.

In the embodiment shown in FIG. 24, if an order from investor 510 conforms to the rule-set, then the order may be executed, for example, with a rapid execution guarantee (e.g., within a guaranteed, specified and/or predetermined time and/or price). Otherwise, pursuant to a previous agreement with investor 510, for example, the order may simply be rejected, with or without feedback to investor 510 (e.g., pursuant to a prior agreement with investor 510). In other embodiments, for example, investor 510 may be given an opportunity to modify the order such that it conforms to the rule-set, to accept a modified order that conforms to the rule-set, or to accept the order with an increased fee (commission). In yet other embodiments, also pursuant to a prior agreement with investor 510, for example, the order placed by investor 510 may be automatically modified (e.g., by reducing the order size) so that it conforms to the rule-set and then executed within the guaranteed and/or predetermined time and/or price. In this case, investor 510 may be notified of the modification to the original order (and/or provided other information) before or after execution of the modified order.

System 2450 shown in FIG. 24 may be, for example, a computer implemented system that analyzes various characteristics of orders originating from investor 510 to determine whether the order conforms to the rule-set. Moreover, as shown in FIG. 24, system 2450 may be a part of, or associated with, consolidating broker-dealer 530. The invention is not limited in these manners.

Figure 25:
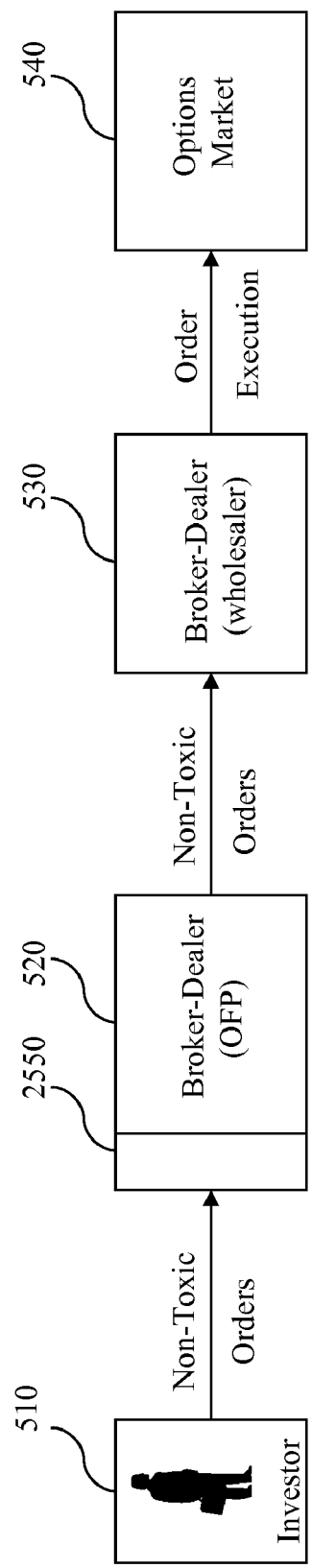
FIG. 25 is a simplified illustration of one example of an order flow in the options market in which a system for determining whether an order conforms to a rule-set is used according to the principles of the present invention.

According to another embodiment of the invention, a system 2550 as shown in FIG. 25 may be used in place of system 2450 shown in FIG. 24 and described above. Similar to system 2450, system 2550 shown in FIG. 25 may be used to determine for all and/or predetermined orders arriving from investor 510 whether the order conforms to the rule-set. If the order conforms to the rule-set, then it may be executed and/or provided a rapid execution guarantee. Otherwise, for example, it may simply be rejected with or without notification to investor 510 (e.g., pursuant to a prior agreement with investor 510). In other embodiments, for example, investor 510 may be given an opportunity to modify the order, to accept a modified order that conforms to the rule-set, or to accept the order with an increased fee (commission). Alternatively, also pursuant to a prior agreement, for example, the order may be automatically modified (e.g., by reducing the order size) so that it conforms to the rule-set, and may then be automatically executed and/or provided a rapid execution guarantee (with or without notification of the modification to investor 510).

System 2550 shown in FIG. 25 may be, for example, a computer implemented system that analyzes various characteristics of orders originating from investor 510 to determine whether the order conforms to the rule-set. Moreover, as shown in FIG. 25, system 2550 may be a part of, or associated with, OFP 520. The invention is not limited in these manners.

Often, the risk of executing a toxic trade rests with OFP 520 or consolidating broker-dealer 530 (or an affiliate). However, there are many times during which the risk may reside completely or at least partially with an exchange (or exchange participant) of options market 140 (e.g., when the profit or loss is based on the bid-offer spread). At these times, it may be desirable for such an exchange to incorporate customer analytic systems such as described above into its order routing and execution mechanisms. Accordingly, while the above description of the invention focuses on the use of toxicity analyzers, profit analyzers, and/or systems for determining conformance with a rule-set by one or both of OFP 120 and consolidating broker-dealer 130, it will be understood that the invention is not limited in this manner.

Figure 26:
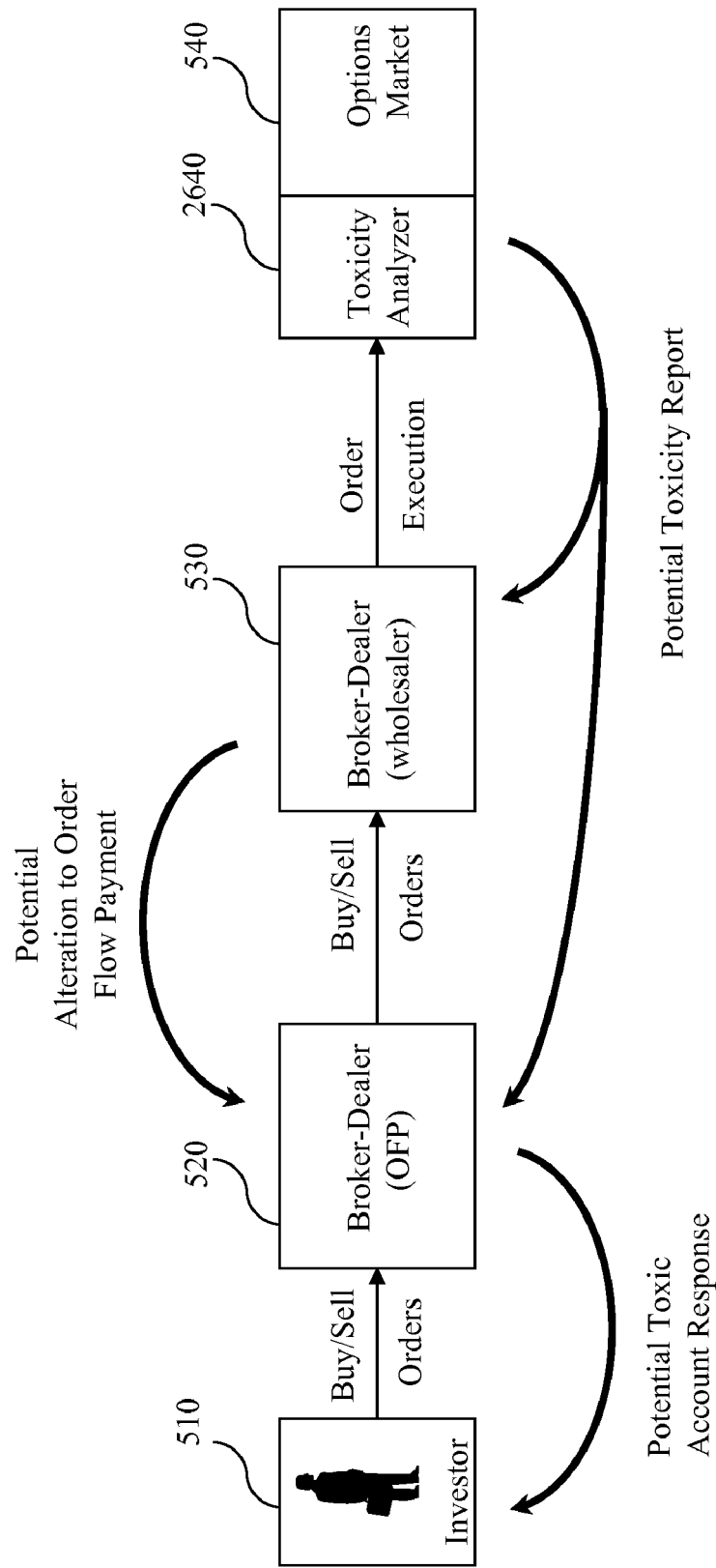
FIG. 26 is a simplified illustration of one example of an order flow in the options market in which a toxicity analyzer is used according to principles of the present invention.

As illustrated by FIG. 26, one or more exchanges of options market 140 may use a toxicity analyzer 2640 to track received options orders and/or to determine whether, and if so, on what terms, an order should be filled (e.g., routed to a specialist on the exchange). When a likely toxic order is submitted to an exchange, as determined by, e.g., toxicity analyzer 2640, the exchange may take any of the approaches described above, including canceling or rejecting the order, executing the order at a later time, automatically altering the order, and/or allowing the investor to alter the order prior to execution. In addition, upon the finding of ineligibility (likely toxicity) of one or more orders by toxicity analyzer 2640, regardless of whether the orders are executed, the exchange can provide a toxicity report to OFP 520 (either directly or through consolidating broker-dealer 530). Using this toxicity report, as explained above, OFP 520 can take corrective action against investor 510, for example, by increasing the transaction fees for orders placed by investor 510, by banning investor 510 altogether from trading through OFP 520, or simply restrict the orders that will be accepted from investor 510 (e.g., based on order size, symbol, etc.). In addition, the exchange using toxicity analyzer 2640 can provide a toxicity report specifically intended for consolidating broker-dealer 530. Using this report, for example, consolidating broker-dealer 530 may decide to alter its order flow payments to OFP 520, thereby providing incentive for OFP 520 to provide a lower toxicity order flow. It will be understood that toxicity analyzer 2640 can be a part of (e.g., owned by the same entity as) the exchange of options market 540 that is using it, or, for example, may be completely independent from, or simply associated with (e.g., under the control of), that exchange. The invention is not limited in this manner.

Figure 27:
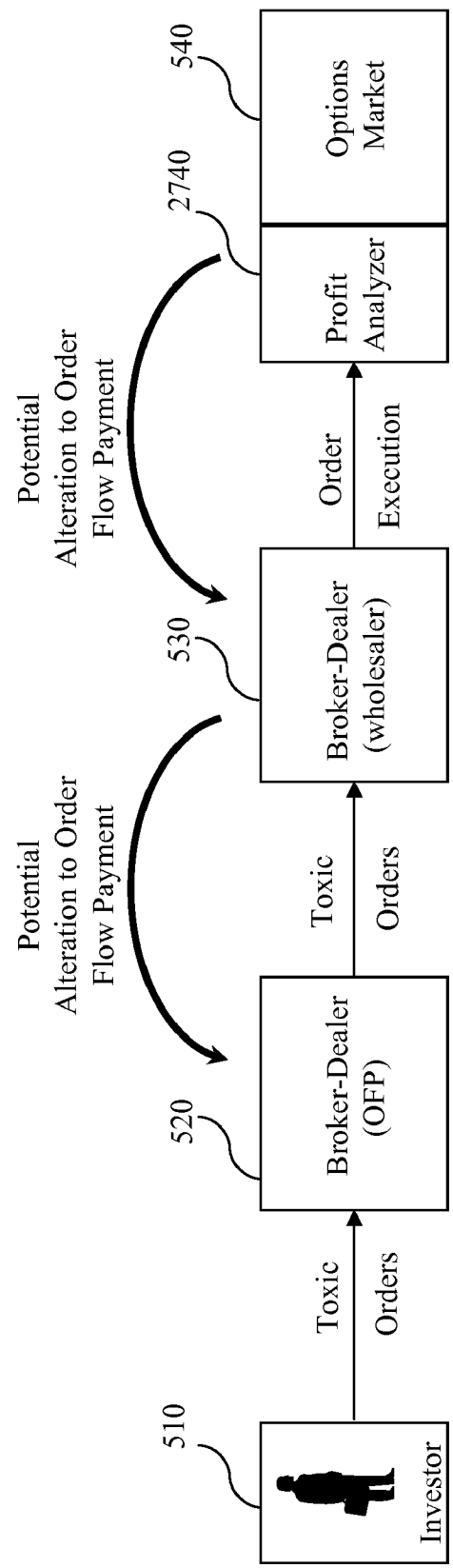
FIG. 27 is a simplified illustration of one example of an order flow in the options market in which a profit analyzer is used according to principles of the present invention.

According to the invention, as shown in FIG. 27, an exchange of options market 540 may use profit analyzer 2740 to track profit and loss on some or all executed trades, similar to the manner in which profit analyzer 2130 is used by consolidating broker-dealer 530 according to the embodiment of the invention shown in FIG. 21. As explained above, an exchange of options market 540 may pay consolidating broker-dealer 530 for routing order flow to its marketplace. According to the invention, measurements made by profit analyzer 2740 can be used to modify such payment based on the toxicity level of the received order flow. In this manner, the exchange, using profit analyzer 2740, is able to induce consolidating broker-dealer 530 to provide a low toxicity order flow. For example, when toxic orders are executed by the exchange, the exchange (using profit analyzer 2740) will record a reduction in profit (or a loss). In response, for example, the exchange may alter its payment to consolidating broker-dealer 530 for that order flow and/or for future order flow. In turn, consolidating broker-dealer 530 may decide to alter the level of its payment for order flow to the OFP 520 that sent the one or more toxic orders (originating from investor 510). It will be understood that profit analyzer 2740 can be a part of (e.g., owned by the same entity as) the exchange of options market 540 that is using it. Alternatively, for example, profit analyzer 2740 may be completely independent from, or simply associated with (e.g., under the control of), that exchange. The invention is not limited in this manner.

Figure 28:
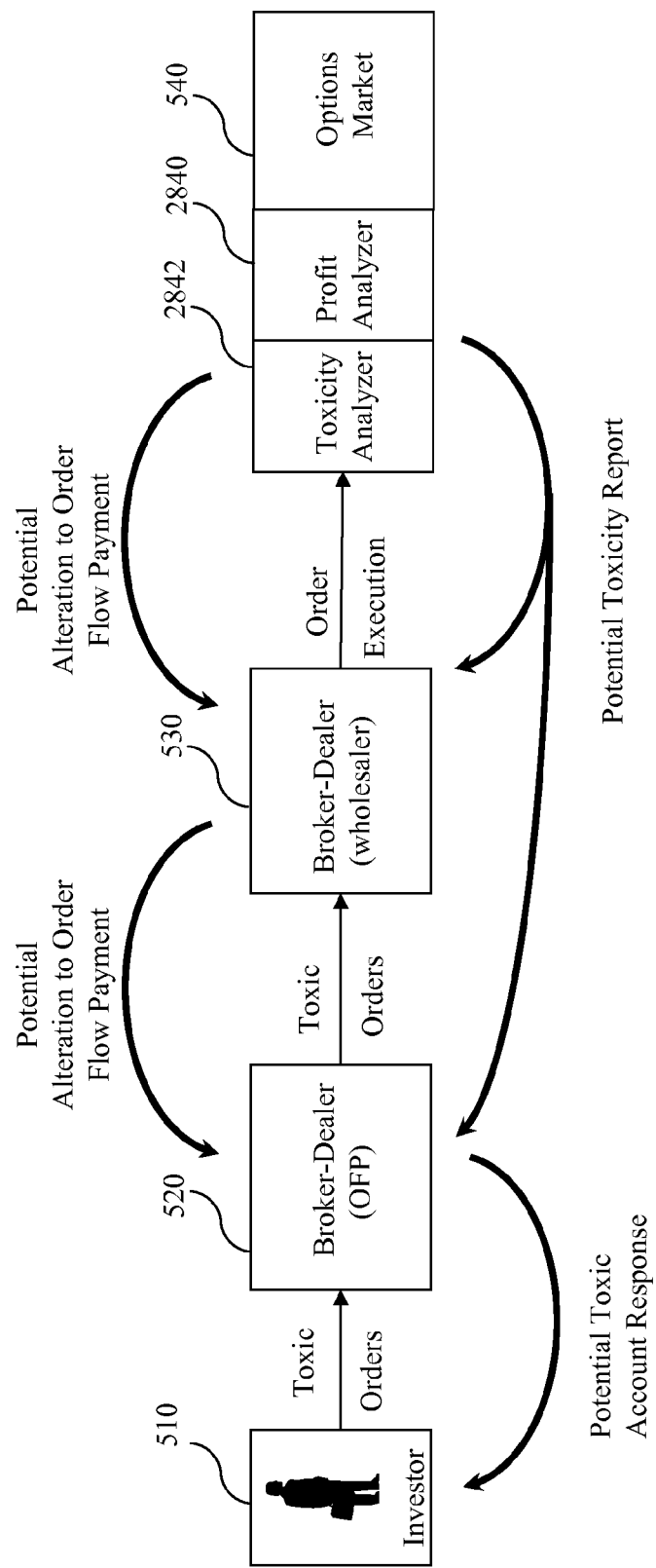
FIG. 28 is a simplified illustration of one example of an order flow in the options market in which a toxicity analyzer and a profit analyzer are used according to principles of the present invention.

According to various other embodiments of the invention, such as that shown in FIG. 28, an exchange of options market 540 can make use of both a profit analyzer 2840 and a toxicity analyzer 2842. In this case, using profit analyzer 2840, the exchange is able to, for example, track profit based on a received order flow and adjust payments to consolidating broker-dealer 530 (which may then adjust payment to OFP 520). In addition, using toxicity analyzer 2842, the exchange can, for example, provide toxicity reports to OFP 520 and/or consolidating broker-dealer 530 as described above. In the case of a toxicity report received by OFP 520, the report can be used to take corrective action against investor 510 (as described above). In the case of a toxicity report received by consolidating broker-dealer 530, for example, consolidating broker-dealer 530 can use the report to adjust payment to the OFP 520. All suitable uses of toxicity and profit analyzers described above apply in the case of an exchange using these analyzers (e.g., as shown in FIG. 28).

Figure 29:
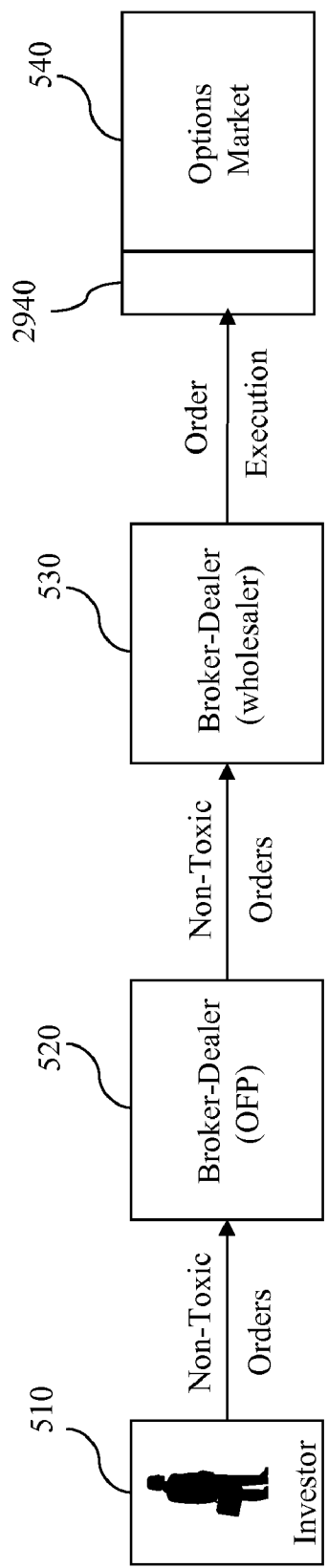
FIG. 29 is a simplified illustration of one example of an order flow in the options market in which a system for determining whether an order conforms to a rule-set is used according to the principles of the present invention.

As shown in FIG. 29, an exchange of options market 540 may also use system 2940 for determining whether an order placed by investor 510 conforms to a rule-set, as described above in connection with systems 2450 and 2550 of FIGS. 24-25, respectively. For example, if an order received by the exchange conforms to the rule-set, as determined by system 2940, then the order may be executed by, e.g., a specialist or other market-maker on the exchange. Otherwise, as described above, the order may be canceled or rejected (e.g., by OFP 510 or consolidating broker-dealer 530), or the investor 510 may be given an opportunity to either modify the order such that it conforms to the rule-set, to accept a modified order that conforms to the rule-set, or to accept the order with an increased fee (commission). Alternatively, for example (and as described above), an order not conforming to the rule-set may be automatically modified (e.g., by reducing the order size) so that it conforms to the rule-set, and then executed by, e.g., a specialist on the exchange. As with systems 2450 and 2550 described above, system 2940 shown in FIG. 29 may be, for example, a computer implemented system that analyzes various characteristics of orders originating from investor 510 to determine whether the order conforms to the rule-set. Moreover, system 2940 may be, for example, either a part of, or associated with, the exchange of options market 540 that is using it. The invention is not limited in this manner.

The provision of the methods and systems to detect, track and respond to toxic order levels in an options contract order flow described above has various benefits to many different constituencies in the options trading world. For example, by providing systems to facilitate the detection of toxic (or likely toxic) orders, broker-dealers and OFPs benefit from their ability to provide execution quality enhancements (e.g., rapid execution guarantees), with minimal risk of exploitation of, for example, stale quotes or insider information, by professional traders. Moreover, they have a tool set which enables them to, for example, give incentives to their trading counterparties to provide an order flow with a reduced level of toxicity. By extension, investors benefit as a result of the higher quality and/or more efficient trade execution which they receive from OFPs and broker-dealers. In addition, those investors with low toxicity order flows will also benefit from being subject to lower transaction costs. Broker-dealers that are able to safely offer guaranteed rapid execution of option trades via the use of toxicity detection, tracking and response systems would be able to significantly differentiate themselves from other broker-dealers that do not have access to such systems. This added differentiation could be used to induce partnering with order flow providers and/or to attract additional order flow from outside a broker-dealer's current network of OFPs.

Moreover, the use of toxicity analyzers, profit analyzers and systems for determining compliance with a rule-set as described herein is not limited to determining whether a rapid execution guarantee should be offered. Rather, as explained above, there are instances where a consolidating broker-dealer not offering a rapid execution guarantee (for a particular order, or ever) would nonetheless be at risk for profit reduction (or loss) when serving as a counter-party. For example, in cases where an investor possesses non-publicly available information (e.g., insider information), which is likely to affect the future movement of an options contract's price, the investor has the opportunity to make essentially risk-free trading profits at the expense of his trading counter-party. In these cases, and several others, it would be beneficial to use one or more toxicity analyzers, profit analyzers, and or systems for determining compliance with a rule-set as described above (e.g., to monitor an options order flow for signs of toxic traders with insider information). Moreover, as explained above, using such order analyzers and/or profit analyzers, corrective action may be taken (e.g., by a consolidating broker-dealer or order flow provider) against the toxic investor or the entity which provided the toxic order flow. Additionally, for example, changes in payment for order flow may be made in response to a particularly toxic order flow history. Accordingly, it will be understood that toxicity analyzers and/or profit analyzers may be used even absent the prospect of offering a rapid execution guarantee, and that this use of such toxicity analyzers, profit analyzers, and or systems for determining compliance with a rule-set is considered to be within the scope of the present invention It should also be noted that the toxicity analyzers, profit analyzers and systems for determining compliance with a rule-set described herein are advantageous under current SEC and options exchange rules, but may also be used in the event selected SEC or exchange rules are altered in the future. For example, in alternative embodiments, the invention could provide the rapid execution guarantee through new market structures and trading technologies (e.g., new order crossing mechanisms) as they are developed and approved by the regulators.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, it will be understood that in alternative embodiments, the present invention will provide a modified guarantee for durations shorter and/or longer than one second (e.g., two seconds). Additionally, for example, it will be understood that, in various embodiments, the present invention will examine selected parameters of incoming orders, and will execute some or all of the orders only to the extent that their individual (or combined) parameters are deemed acceptable.

It will also be understood that, according to various embodiments of the present invention, the toxicity analyzers, profit analyzers and/or systems for determining compliance with a rule-set will be capable of communicating using the protocol or protocols by which orders in the options order flow are transmitted. For example, these components and systems may be constructed such that details of orders (e.g., order parameters) being transmitted between various parties in the options order flow chain may be directly ascertainable. Accordingly, the toxicity analyzers, profit analyzers and/or systems for determining compliance with a rule-set described above may be capable of communicating with some or all of the commonly used protocols that include, for example, Financial Information Exchange (FIX), Common Message Switch (CMS), as well as other standard proprietary protocols. According to various other embodiments of the invention, for example, additional components and/or systems (that are compatible with the protocol or protocols by which orders are being transmitted) may be used for communicating various order details to the toxicity analyzers, profit analyzers and/or systems for determining compliance with a rule-set when they are not capable of directly ascertaining order details. The invention is not limited in this manner.

The detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description provided above.

The system according to the invention may include a general purpose computer, or a specially programmed special purpose computer. The user may interact with the system via, e.g., a personal computer or PDA, over, e.g., the Internet an Intranet, etc. The system may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. It should also be noted that, while some embodiments described above may currently not be approved under federal or other relevant regulations, these embodiments are nevertheless considered to be part of the present invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The many features and advantages of the embodiments of the present invention are apparent from the detail specification, and thus, it is intended to cover all such features and advantages of the invention that fall within the true spirit and scope of the invention. All suitable modifications and equivalents maybe resorted to, falling within the scope of the invention.

What is claimed is:

1. A method of executing an order for a listed options contract using a computer, the method at least one of implemented and assisted by the computer, comprising:
   electronically receiving the order by a first computer order system, from a broker-dealer computer system;
   electronically transmitting the order by the first computer order system to an options exchange for execution;
   monitoring the outcome of the trade by the first computer order system when the order is sent to the options exchange for execution; and if the first computer order system determines that the completed trade is toxic responsive to order characteristics comprising order parameters, market condition parameters and execution parameters and where a toxic trade is indicative of the order having a characteristic of one of no profit, reduced profit and a loss when at least one of a wholesaler and a market maker provides market liquidity, the first computer order system implementing a corrective action based at least in part on the step of monitoring the outcome of the trade.

2. The method of claim 1, wherein the step of determining if the completed trade is toxic comprises the step of reviewing one or more parameters of the order relating to at least one of size of the order, frequency of order submission, identity of the option, market source of national-best-bid-or-offer (NBBO), order size relative to NBBO size, liquidity of the option contract in the market, liquidity of the underlying equity, current NBBO bid-offer spread, and option class of the order.

3. The method of claim 1, further comprising the steps of:

electronically receiving the order from an order flow provider computer system; and electronically transmitting the order from the order flow provider computer system to a broker-dealer computer system.

4. The method of claim 3, further comprising the step of electronically transmitting a toxicity report to the order flow provider based at least in part on the toxic trade determination.

5. The method of claim 1, further comprising the step of placing the order by an investor.

6. The method of claim 1, further comprising the step of placing the order by an order flow provider.

7. The method of claim 1, wherein the step of taking corrective action comprises modifying payment for the order.

8. The method of claim 1, wherein the step of taking corrective action comprises modifying payment for future order flow.

9. The method of claim 1, wherein the step of taking corrective action comprises increasing the fee for the investor that placed the order.

10. The method of claim 1, wherein the step of taking corrective action comprises increasing the fee for future orders submitted by the investor that placed the order.

* * * * *